US010318436B2

(12) United States Patent
McAvoy et al.

(10) Patent No.: US 10,318,436 B2
(45) Date of Patent: Jun. 11, 2019

(54) PRECISE INVALIDATION OF VIRTUALLY TAGGED CACHES

(71) Applicant: QUALCOMM Incorporated, San Diego, CA (US)

(72) Inventors: William McAvoy, Raleigh, NC (US); Brian Stempel, Raleigh, NC (US); Spencer Williams, Raleigh, NC (US); Robert Douglas Clancy, Cary, NC (US); Michael Scott McIlvaine, Raleigh, NC (US); Thomas Philip Speier, Wake Forest, NC (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 15/658,819

(22) Filed: Jul. 25, 2017

(65) Prior Publication Data

US 2019/0034349 A1 Jan. 31, 2019

(51) Int. Cl.
*G06F 12/00* (2006.01)
*G06F 12/1045* (2016.01)
*G06F 12/0891* (2016.01)
*G06F 12/0895* (2016.01)
*G06F 13/00* (2006.01)
*G06F 13/28* (2006.01)

(52) U.S. Cl.
CPC ...... *G06F 12/1045* (2013.01); *G06F 12/0891* (2013.01); *G06F 12/0895* (2013.01); *G06F 12/1063* (2013.01); *G06F 2212/1024* (2013.01); *G06F 2212/152* (2013.01); *G06F 2212/452* (2013.01); *G06F 2212/60* (2013.01); *G06F 2212/608* (2013.01); *G06F 2212/683* (2013.01)

(58) Field of Classification Search
CPC ............ G06F 12/1045; G06F 12/0891; G06F 12/0895; G06F 12/1063; G06F 2212/60; G06F 2212/683; G06F 2212/1024; G06F 2212/152; G06F 2212/452; G06F 2212/608
See application file for complete search history.

(56) References Cited

U.S. PATENT DOCUMENTS 5,146,603 A * 9/1992 Frost .................... G06F 12/0831
711/143
5,317,705 A * 5/1994 Gannon .............. G06F 12/1036
718/100

(Continued)

OTHER PUBLICATIONS

International Search Report and Written Opinion—PCT/US2018/038794—ISA/EPO—dated Sep. 9, 2018.

*Primary Examiner* — Mark A Giardino, Jr.
(74) *Attorney, Agent, or Firm* — Patterson & Sheridan, LLP

(57) ABSTRACT

A translation lookaside buffer (TLB) index valid bit is set in a first line of a virtually indexed, virtually tagged (VIVT) cache. The first line of the VIVT cache is associated with a first TLB entry which stores a virtual address to physical address translation for the first cache line. The TLB index valid bit of the first line is cleared upon determining that the translation is no longer stored in the first TLB entry. An indication of a received invalidation instruction is stored. When a context synchronization instruction is received, the first line of the VIVT cache is cleared based on the TLB index valid bit being cleared and the stored indication of the invalidate instruction.

30 Claims, 17 Drawing Sheets

(56) References Cited

U.S. PATENT DOCUMENTS

| | | | |
|---|---|---|---|
| 5,845,325 A * | 12/1998 | Loo | G06F 12/0842 |
| | | | 711/135 |
| 6,510,508 B1 * | 1/2003 | Zuraski, Jr. | G06F 12/1027 |
| | | | 711/135 |
| 6,606,687 B1 * | 8/2003 | Chauvel | G06F 12/0804 |
| | | | 365/236 |
| 7,552,254 B1 | 6/2009 | George et al. | |
| 7,802,055 B2 | 9/2010 | Sartorius et al. | |
| 8,185,692 B2 * | 5/2012 | Caprioli | G06F 12/1027 |
| | | | 711/118 |
| 8,522,253 B1 * | 8/2013 | Rozas | G06F 9/45558 |
| | | | 711/205 |
| 8,918,601 B2 | 12/2014 | Woffinden | |
| 2005/0182903 A1 | 8/2005 | Kinter et al. | |
| 2013/0185520 A1 | 7/2013 | Dieffenderfer et al. | |
| 2015/0143047 A1 | 5/2015 | Hagersten et al. | |
| 2016/0140042 A1 | 5/2016 | Mukherjee | |
| 2016/0140051 A1 * | 5/2016 | Kessler | G06F 12/1045 |
| | | | 711/119 |
| 2018/0089094 A1 * | 3/2018 | Clancy | G06F 12/0891 |

* cited by examiner

PRECISE INVALIDATION OF VIRTUALLY TAGGED CACHES

BACKGROUND

Aspects disclosed herein relate to processing systems designed to handle virtual addresses. More specifically, aspects disclosed herein relate to precise and efficient invalidation mechanisms for virtually tagged structures, such as a virtually indexed virtually tagged (VIVT) cache.

Virtual memory extends physical memory space and improves the efficiency of sharing the physical memory among applications, processors, and other entities of a processing system. A virtual address is used to address the virtual memory space, which is divided into blocks of contiguous virtual memory addresses, or "pages." Software programs may be written with reference to virtual addresses, while for execution of program instructions by the processors, a translation of the virtual addresses to physical address may be performed.

Memory management units (MMUs) may be used for looking up page tables which map virtual addresses to corresponding physical addresses to obtain translations of the virtual addresses to physical addresses, a process referred to as a "page table walk." Page table walks are often time consuming, so MMUs may include hardware such as a translation lookaside buffer (TLB) to cache translations for frequently accessed pages. The TLB may be implemented as a tagged hardware lookup table, which is tagged using the virtual addresses. Thus, if a virtual address hits in the TLB (i.e., there is a matching tag in the TLB for the virtual address), the corresponding physical address translation may be retrieved from the TLB, without having to incur the costs associated with a page table walk. The retrieved physical address may then be used for accessing memory structures such as the shared memory or one or more caches which may be present between the processors and the shared memory.

A cache is a small, high speed memory structure which stores a limited number of frequently accessed data (and/or data determined to have high likelihood of future use) and offers a faster access path for the data stored in the cache, in comparison to the longer access times which may be incurred for accessing a backing storage location of the cache (e.g., another cache or the shared memory such as a main memory). While the cache may be indexed and tagged with physical addresses associated with the data stored therein (also referred to as a physical indexed physically tagged or "PIPT" cache), it may be beneficial to alternatively implement the cache as a memory structure which is indexed and tagged using virtual addresses (also referred to as a virtually indexed and virtually tagged or "VIVT" cache).

Since the VIVT cache may be accessed using the virtual addresses, a translation of the virtual addresses to physical addresses is not required to search the cache, and so the VIVT cache may offer a faster access time. However, in some cases, the VIVT cache may be made to appear as a PIPT cache to software, to avoid scenarios where an entire cache may be invalidated by software upon a translation change (e.g., pursuant to a context switch between applications which use different pages and correspondingly, different virtual to physical address translations) that might not even be relevant to the cache. However, conventional implementations of a VIVT cache which appears as a PIPT cache to software suffer from drawbacks. For example, each virtual address page may cover a physical address space which is greater than the size of a cache line of the cache. Accordingly, even if only a single entry of the TLB or a single page is to be invalidated for a given TLB invalidate operation, there are no efficient processes for determining which specific cache lines of the cache are to be correspondingly invalidated. Thus, in conventional implementations, in the case of a TLB invalidate operation, the entire VIVT cache is invalidated.

Some techniques attempt to mitigate the number of lines invalidated in a VIVT instruction cache (I-cache) by filtering invalidates using a TLB. In such cases, the VIVT I-cache lines associated with a TLB entry being displaced must be invalidated.

SUMMARY

In one aspect, a method comprises setting a translation lookaside buffer (TLB) index valid bit in a first line of a virtually indexed virtually tagged (VIVT) cache. The first line of the VIVT cache is associated with a first TLB entry which stores a virtual address to physical address translation for the first cache line. Upon determining that the translation for the first cache line is no longer in the first TLB entry, the TLB index valid bit in the first line of the VIVT cache is cleared. Responsive to receiving a translation invalidate instruction that may be for the virtual address, an indication of the invalidate instruction is stored. Responsive to receiving a context synchronization instruction, the first line of the VIVT cache is invalidated based on the TLB index valid bit being cleared and the stored indication of the invalidate instruction.

In one aspect, a non-transitory computer-readable medium stores instructions that, when executed by a processor, cause the processor to perform an operation comprising setting a translation lookaside buffer (TLB) index valid bit in a first line of a virtually indexed virtually tagged (VIVT) cache. The first line of the VIVT cache is associated with a first TLB entry which stores a virtual address to physical address translation for the first cache line. Upon determining that the translation for the first cache line is no longer in the first TLB entry, the TLB index valid bit in the first line of the VIVT cache is cleared. Responsive to receiving a translation invalidate instruction that may be for the virtual address, an indication of the invalidate instruction is stored. Responsive to receiving a context synchronization instruction, the first line of the VIVT cache is invalidated based on the TLB index valid bit being cleared and the stored indication of the invalidate instruction.

In one aspect, an apparatus comprises a translation lookaside buffer (TLB) and a virtually indexed virtually tagged (VIVT) cache. The apparatus further comprises logic configured to perform an operation comprising setting a translation lookaside buffer (TLB) index valid bit in a first line of a virtually indexed virtually tagged (VIVT) cache. The first line of the VIVT cache is associated with a first TLB entry which stores a virtual address to physical address translation for the first cache line. Upon determining that the translation for the first cache line is no longer in the first TLB entry, the operation clears the TLB index valid bit in the first line of the VIVT cache. Responsive to receiving a translation invalidate instruction that may be for the virtual address, the operation stores an indication of the invalidate instruction. Responsive to receiving a context synchronization instruction, the operation invalidates the first line of the VIVT cache based on the TLB index valid bit being cleared and the stored indication of the invalidate instruction.

In one aspect, an apparatus comprises a translation lookaside buffer (TLB) and a virtually indexed virtually tagged (VIVT) cache. The apparatus further comprises means for setting a translation lookaside buffer (TLB) index valid bit in a first line of a virtually indexed virtually tagged (VIVT) cache. The first line of the VIVT cache is associated with a first TLB entry which stores a virtual address to physical address translation for the first cache line. The apparatus further includes, upon determining that the translation for the first cache line is no longer in the first TLB entry, means for clearing the TLB index valid bit in the first line of the VIVT cache. The apparatus further includes, responsive to receiving a translation invalidate instruction that may be for the virtual address, the means for storing an indication of the invalidate instruction. The apparatus further includes, responsive to receiving a context synchronization instruction, means for invalidating the first line of the VIVT cache based on the TLB index valid bit being cleared and the stored indication of the invalidate instruction.

BRIEF DESCRIPTION OF THE SEVERAL VIEWS OF THE DRAWINGS

So that the manner in which the above recited aspects are attained and can be understood in detail, a more particular description of aspects of the disclosure, briefly summarized above, may be had by reference to the appended drawings.

It is to be noted, however, that the appended drawings illustrate only aspects of this disclosure and are therefore not to be considered limiting of its scope, for the disclosure may admit to other aspects.

DETAILED DESCRIPTION

Figure 1A:
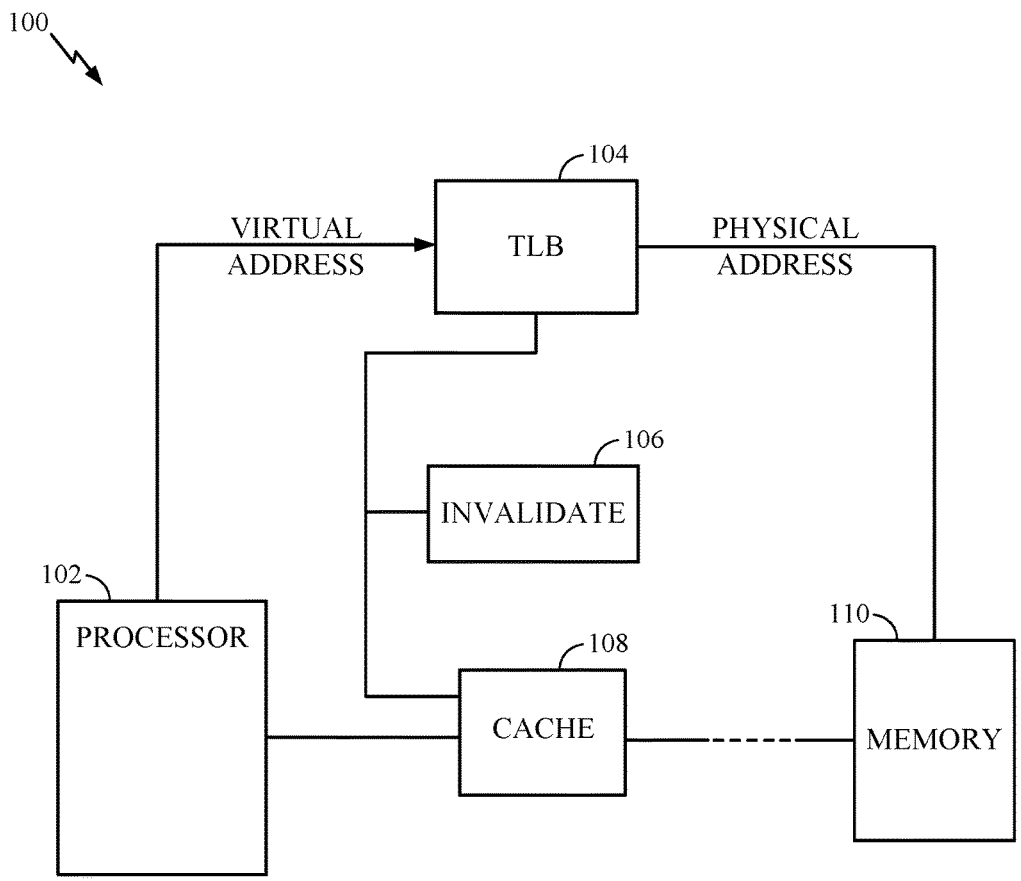
FIGS. 1A-1K illustrate a processing system and exemplary aspects of performing invalidations according to aspects of the disclosure.

Aspects disclosed herein provide techniques to selectively invalidate cache lines in a virtually tagged memory structure, such as a virtually indexed virtually tagged (VIVT) cache. Generally, each cache line is tagged with a TLB index value of a TLB entry which stores a virtual address to physical address translation for the cache line. Furthermore, each cache line includes a TLB index valid bit which reflects whether the TLB entry storing the translation for the cache line is valid (e.g., the translation for the cache line is resident in the TLB index). When a cache line is filled and a TLB entry is established, the index of the TLB entry is stored in the cache line, and the TLB index valid bit is set.

Aspects of the disclosure further provide an invalidate vector which tracks whether an invalidate instruction has been received for a TLB index. Advantageously, however, the invalidate vector is configured to track whether an entry in the TLB has been evicted and/or replaced. More specifically, assuming the TLB has N entries, the invalidate vector has N+1 entries, where the extra entry is used to reflect whether an evicted and replaced TLB entry has been invalidated. Therefore, when the cache line is filled, and the TLB entry is established, an entry corresponding to the TLB index in the invalidate vector is cleared.

Therefore, assume a first cache line is filled and associated with a TLB index value of 0, and the TLB entry at TLB index value of 0 is established. The TLB valid bit for the first cache line is set (e.g., to a value of 1), and the invalidate vector at index 0 is cleared (indicating no invalidate instructions have been received since the TLB entry at TLB index 0 was established). Subsequently, the virtual to physical translation for the first cache line stored at TLB index 0 is evicted and replaced with another translation. In response, aspects disclosed herein clear the TLB index valid bit in the first cache line (e.g., update the value to 0). The TLB may then receive an invalidate instruction (e.g., a cache invalidate and/or a TLB invalidate) specifying to invalidate the virtual address of the first cache line. Aspects disclosed herein may then translate the virtual address specified in the invalidate instruction to a physical address, which is then used to search the TLB. However, since the entry for the first cache line has been evicted from the TLB, no matches are found in the TLB. In response, aspects disclosed herein set the bit in the invalidate vector corresponding to evicted and replaced TLB entries (e.g., entry N+1 of the invalidate vector). When a context synchronization instruction is received, aspects disclosed herein reference the invalidate vector to determine that at least one invalidate instruction is pending (e.g., based on the set bit at entry N+1 of the invalidate vector). Because at least one invalidate instruction is pending, aspects disclosed herein then determine to invalidate at least one line of the VIVT cache. Specifically, aspects disclosed herein invalidate each line of the VIVT cache having a TLB index valid bit that is cleared (e.g., having a value of 0).

FIG. 1A illustrates a processing system 100 which performs precise invalidations of virtually tagged structures, according to one aspect. As shown, the processing system 100 includes a processor 102 coupled to a translation lookaside buffer (TLB) 104, an invalidate vector structure 106, a cache 108, and a memory 110. Processor 102 may be a central processing unit (CPU) or any processor core in general. Processor 102 may be configured to execute programs and software which may reference virtual addresses. Cache 108 is representative of one or more caches, each of which may be an instruction cache, a data cache, or a combination thereof. In one aspect, cache 108 is configured as a VIVT cache which may be accessed by the processor 102 using virtual addresses. Cache 108, as well as one or more backing caches which may be present (but not explicitly shown) may be in communication with a main memory such as memory 110. Memory 110 may comprise physical memory in a physical address space and a memory management unit comprising TLB 104 may be used to obtain translations of virtual addresses (e.g., from processor 102) to physical addresses for ultimately accessing memory 110. Although the memory 110 may be shared amongst one or more other processors or processing elements, these have not been illustrated, for the sake of simplicity. The processing system 100 includes logic such as control logic (not pictured) to selectively invalidate cache lines from the cache 108, the functionality of which is described in greater detail below.

The invalidate vector 106 stores indications of whether a given TLB entry in the TLB 104 is pending invalidation. The cache 108 also includes, for each cache line, a tag of the TLB index which stores the translation for the virtual address to the physical address for the cache line, and a TLB index invalid bit which reflects whether the translation for the virtual address to the physical address for the cache line remains stored in the TLB index. Furthermore, as discussed in greater detail below, the invalidate vector 106 includes an entry for TLB entries that have been replaced. Means for storing data in the TLB 104, invalidate vector 106, and cache 108 include one or more memory cells.

Figure 1B:
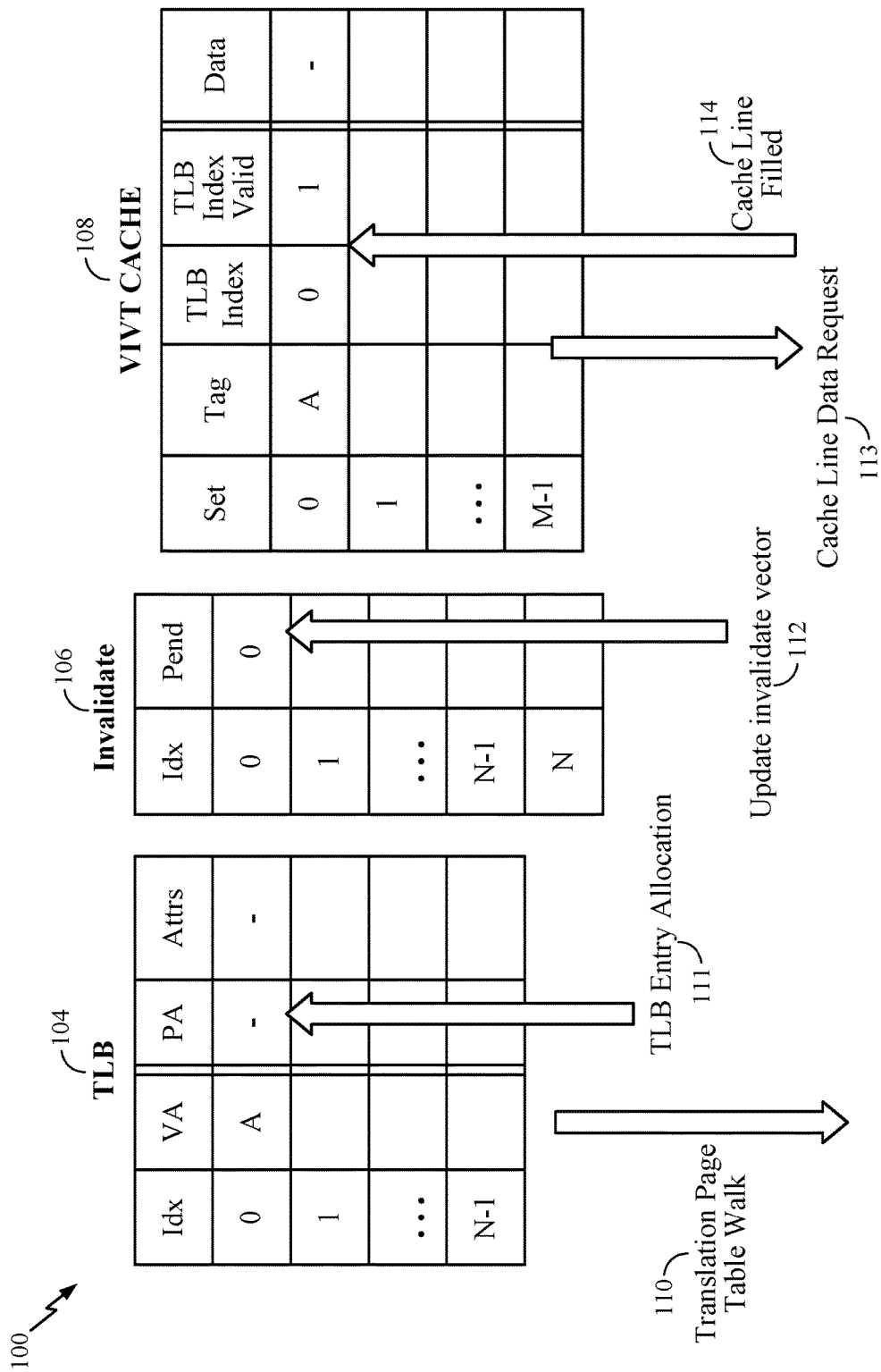

FIG. 1B depicts the TLB 104, invalidate vector 106, and cache 108 in greater detail. As shown, the TLB 104 is a structure of N entries, each of which includes an index value (indexed from 0 to N−1), a virtual address, a physical address and other attributes (such as an application space identifier (ASID), processor identifier (PID), etc., each of which is not pictured for the sake of clarity). The invalidate vector 106 is a structure of N+1 entries. The index values of 0 to N−1 of the invalidate vector 106 each correspond to the indices 0 to N−1 of the TLB 104, includes a pending bit which specifies whether the corresponding TLB index has a pending invalidation. In this example, the Nth index value of the invalidate vector 106 is associated with TLB entries that have been evicted and replaced from the TLB 104 (or are otherwise no longer resident in the TLB 104), and the pending bit for this entry specifies whether an invalidate is pending for these evicted and replaced entries. However, any one of the index values of the invalidate vector 106 may be associated with TLB entries that have been evicted and replaced from the TLB 104.

The cache 108 is depicted as a set-associative cache, with M sets 0 to M−1, with only one representative cache line shown in each set, which is tagged with a virtual address (the "tag" column). Each set is shown as including one cache line for the sake of simplicity, as each set may comprise more than one cache line. Furthermore, the cache 108 includes a TLB index field and a TLB index valid bit. The TLB index field associates each cache line with an index value of the TLB 104. The TLB index valid bit indicates whether the associated TLB entry stores the translation for the cache line. The cache 108 may further include other information, such as an ASID, PID, and the like, each not pictured for the sake of clarity.

Because the cache 108 is a VIVT cache, the processor 102 accesses the cache using virtual memory addresses. For example, the processor 102 may issue a request to fetch a cache line from a virtual address (VA) denoted as "A" from the cache 108. Generally, the data stored in the cache 108 is accessed by indexing into one of the M sets using a portion of the virtual address, and comparing tags of one or more cache lines within that set with another portion of the virtual address. If there is a match with one of the tags, there is a cache "hit", otherwise, there is a "miss". If there is a hit in the cache 108, then the cache line at an address whose index corresponds to and tag matches a portion of the virtual address "A" in the cache 108 is returned to the processor 102. However, if there is a miss in the cache 108, the TLB 104 is accessed to obtain a translation for the virtual address "A" to a corresponding physical address (PA), before backing storage locations of the cache 108 are accessed using the physical address. However, there may be a miss in the TLB 104. As such, at event 110, a translation page table walk is performed to retrieve the translation for the virtual address A to a corresponding physical address. At event 111, an entry in the TLB 104 for the virtual address A is established, where index 0 of the TLB 104 is populated with the virtual address A and the retrieved physical address corresponding to the virtual address. Additionally, at event 112, which may take place simultaneously or in conjunction with event 111, the invalidate vector 106 is updated to indicate that the TLB entry at index 0 does not have an invalidate operation pending (e.g., the pending bit is set to "0" for index 0 in the invalidate vector 106).

At event 113, the cache line is retrieved from a backing storage location using the physical address corresponding to virtual address A. At event 114, the cache line is filled in the cache 108 (e.g., in set 0 in the example shown), and the cache line is tagged with the virtual address A, or a portion of the virtual address A (e.g., a subset of bits of the virtual address A). Additionally, the cache line is tagged with the TLB index 0 corresponding to the TLB entry which was allocated at event 111 with the translation of the virtual to physical address for the cache line. Furthermore, the TLB index valid bit for the cache line is set to 1, indicating that the virtual to physical address translation for the cache line stored in index 0 of the TLB 104 is valid.

Figure 1C:
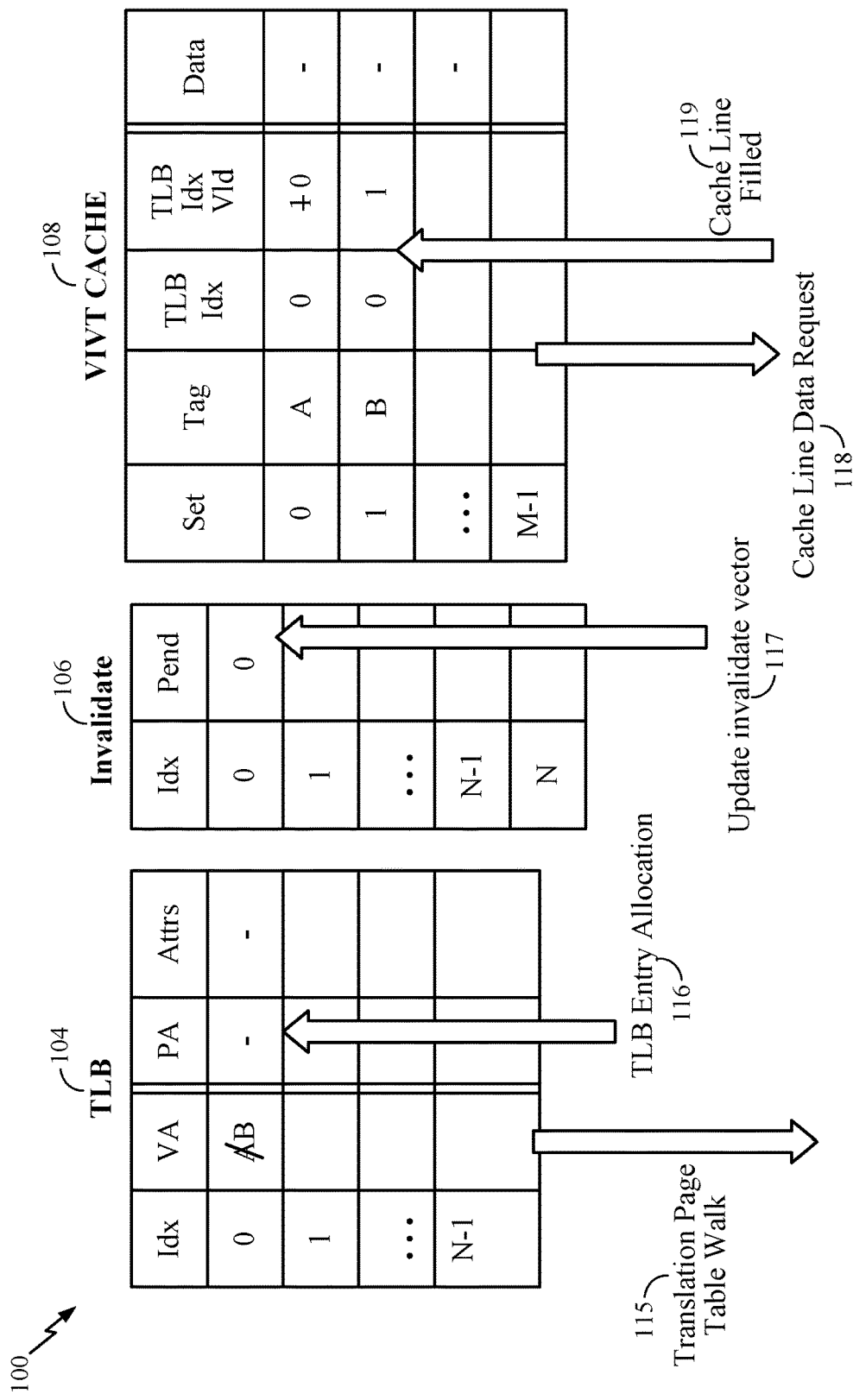

FIG. 1C depicts an example aspect where the entry for the virtual address A at index 0 of the TLB 104 is evicted and replaced. Assuming the processor 102 requests to fetch a cache line from a virtual address denoted as "B" from the cache 108, there is a miss for the virtual address B in the cache 108, and there is a miss for a translation of the virtual address B in the TLB 104. As such, at event 115, a translation page table walk is performed to retrieve the translation for the virtual address B to a corresponding physical address. At event 116, the entry for virtual address A is evicted from index 0 of the TLB 104, and an entry for virtual address B is established. Again, establishing the entry for virtual address B includes storing the virtual address B and the retrieved physical address. At event 117, which may take place simultaneously or in conjunction with event 116, the invalidate vector 106 is updated to indicate that the TLB entry at index 0 does not have an invalidate operation pending.

At event 118, the cache line is retrieved from a backing storage location using the physical address corresponding to virtual address B. At event 119, the cache line is filled in the cache 108 (e.g., in set 1 in the example shown), and the cache line is tagged with the virtual address B, or a portion of the virtual address B (e.g., a subset of bits of the virtual address B). Additionally, the cache line is tagged with the TLB index 0 corresponding to the TLB entry which was allocated at event 116 with the translation of the virtual to physical address for the cache line. Furthermore, the TLB index valid bit for the cache line is set to 1, indicating that the virtual to physical address translation for the cache line stored in index 0 of the TLB 104 is valid. Further still, as shown, the TLB index valid bit for virtual address A is changed from 1 to 0, as the TLB index 0 no longer stores the virtual to physical translation for virtual address A. Advantageously, however, the cache line for virtual address A remains in the cache 108 until an invalidation instruction and a context synchronization operation are received in the processing system 100.

More generally, when an entry in the TLB 104 is allocated, the processor 102 determines whether the bit in the invalidate vector 106 associated with the TLB index of the page being allocated has a value of 1. If the bit in the invalidate vector 106 associated with the TLB index of the page being allocated has a value of 1, the invalidate vector 106 at index N is set to 1 (if not already set to a value of 1) to indicate that there is now a pending invalidate for an invalid TLB index.

Figure 1D:
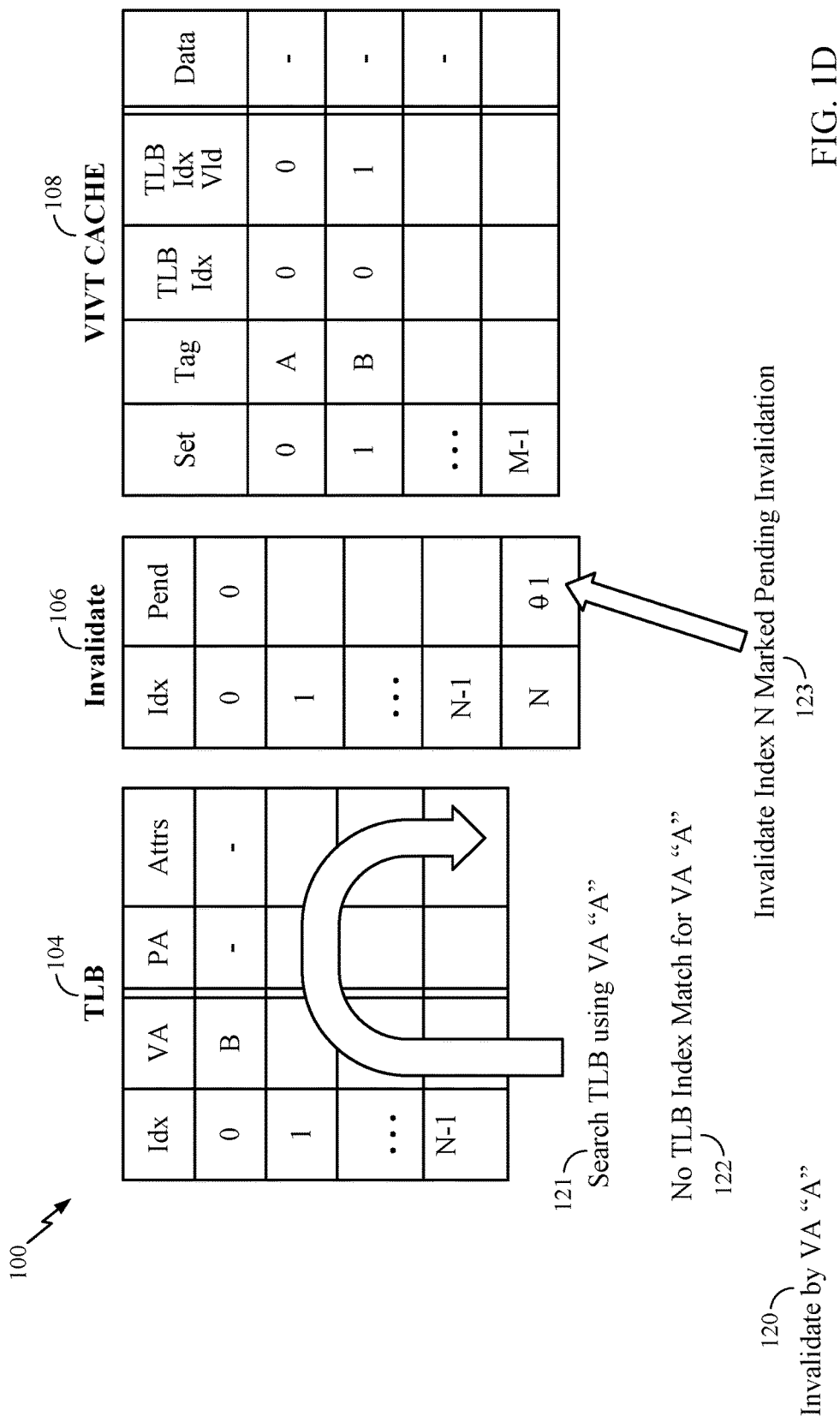

FIG. 1D depicts an example aspect where an invalidate instruction specifying to invalidate by virtual address "A" is received at block 120. Generally, an invalidation instruction may be based on a context change, and sent by an operating system and/or the processor 102. The invalidation operation may be because the virtual address no longer maps to the previously associated physical address. In at least one aspect the invalidate instruction is a TLB invalidate instruction specifying to remove the virtual to physical mapping for the virtual address A.

At event 121, the TLB 104 is searched using the virtual address A. However, because this entry was evicted in the example depicted in FIG. 1C, at event 122, no match is found in the TLB 104 for virtual address A. As such, the invalidate vector 106 at index N is marked pending invalidation at event 123. Doing so indicates that at least one invalidate operation may target at least one cache line in the cache 108, even though the corresponding translation is no longer resident in the TLB 104.

Figure 1E:
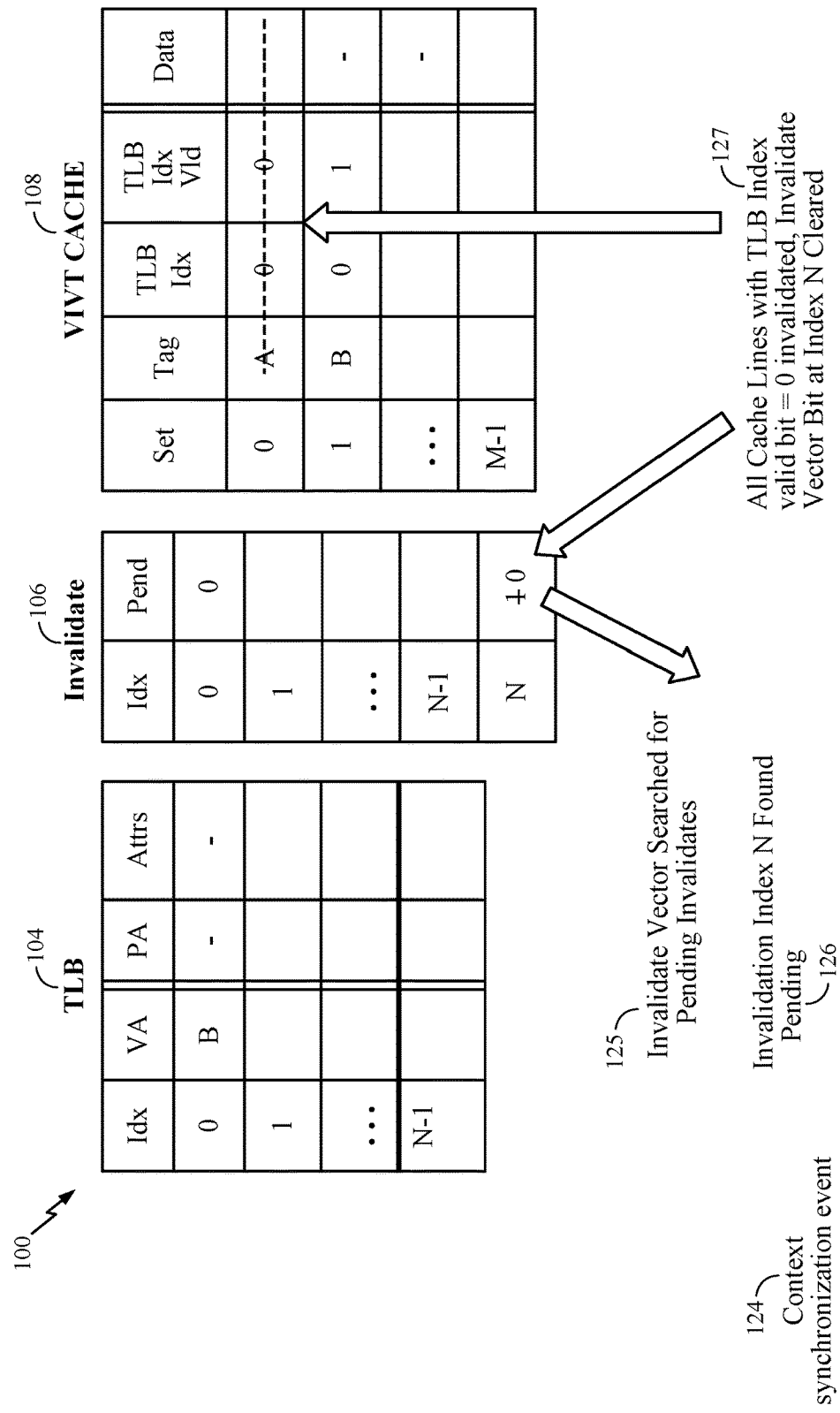

FIG. 1E reflects an aspect where a context synchronization event 123 is received by the processing system 100. Generally, context synchronization is a point in the sequence of instructions being executed (e.g., by processor 102), which mandates that any change to architectural resources (e.g., registers) before this point is to be observed by all instructions after this point. A context synchronizing event can be inserted into the sequence of instructions being executed in one or more ways, including, for example, by software, through the use of a context synchronizing instruction (e.g. an instruction barrier); by hardware, before or after a hardware-enforced context synchronizing event as defined by an applicable instruction set architecture (ISA) (e.g. before an exception or after execution of a hardware-synchronized register access); or by hardware for an internal operation, which may be invisible to software. As such, the invalidate operations to cache lines of cache 108 need not be applied (e.g., due to translation changes) until a context synchronization event forces the changes by the translation invalidate to be observed by subsequent instructions after the context synchronization event.

Responsive to the context synchronization event 124, at event 125, the invalidate vector 106 is searched for pending invalidates. Because the entry at index N of the invalidate vector 106 is set to 1, at least one invalidate of the cache 108 is pending at event 126. At event 127, all cache lines having a TLB index valid bit set to 0 are invalidated, and the bit at index N of the invalidate vector 106 is cleared (e.g., updated to 0). Specifically, as shown, in FIG. 1E, the cache line for virtual address A is invalidated, while the cache line for virtual address B is not invalidated. Doing so allows for selective invalidation of the cache 108, even if translations for the cache lines are not stored in the TLB 104. While the invalidation of the cache line for virtual address A is depicted using strikethrough notation, in practice, the invalidation is effected by changing a valid bit associated with the cache line to indicate that the cache line is invalid.

Figure 1F:
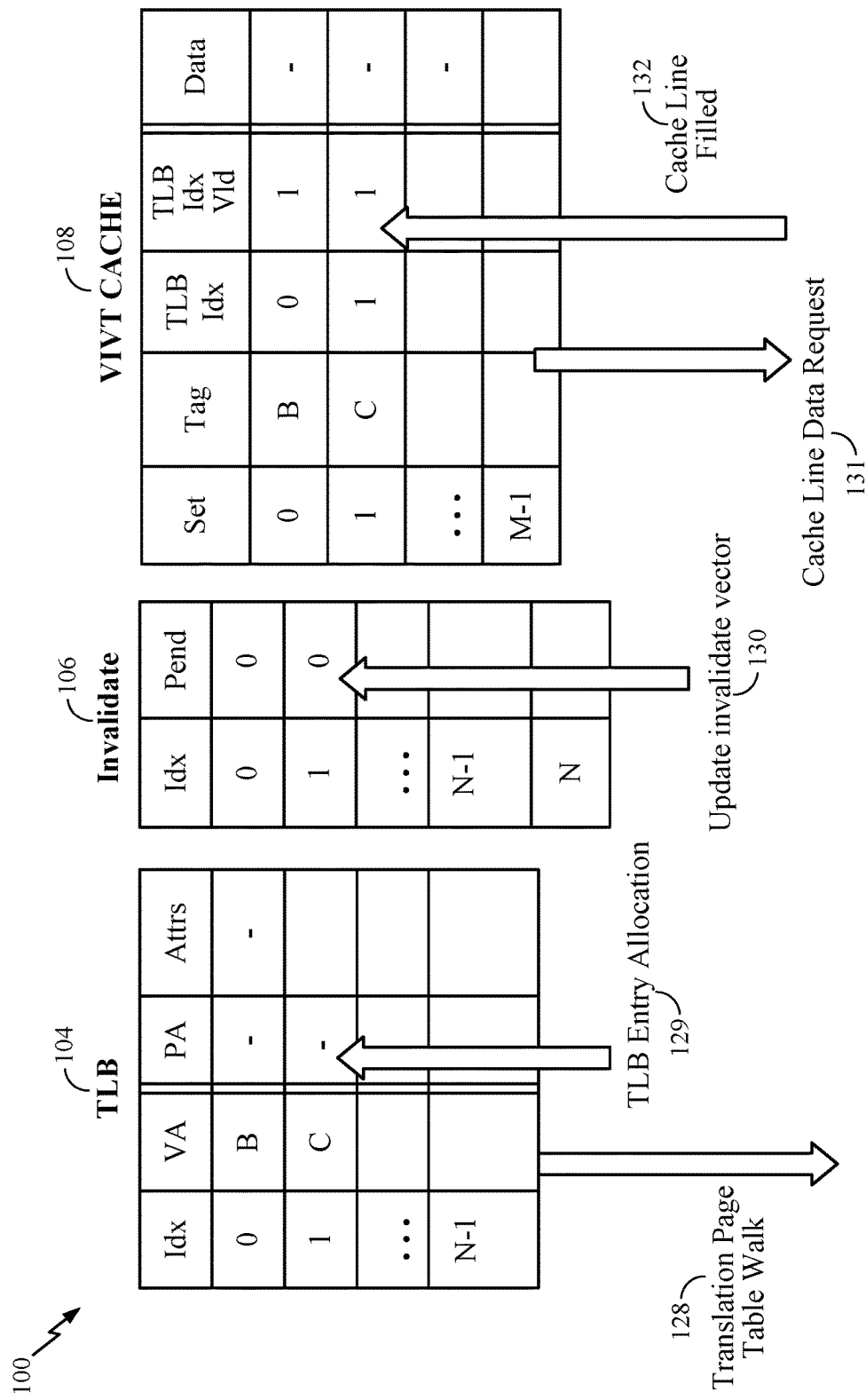

Advantageously, the invalidate vector 106 and cache 108 are configured to selectively invalidate multiple cache lines when two or more corresponding entries in the TLB 104 are no longer resident. FIG. 1F depicts an aspect where the processor 102 issues a request to fetch a cache line from a virtual address denoted as "C" from the cache 108, there is a miss for the virtual address C in the cache 108, and there is a miss for a translation of the virtual address C in the TLB 104. As such, at event 128, a translation page table walk is performed to retrieve the translation for the virtual address C to a corresponding physical address. At event 129, the entry for virtual address C is established in index 1 of the TLB 104 (as an entry for virtual address B is resident in the TLB 104). Again, establishing the entry for virtual address C includes storing the virtual address C and the retrieved physical address. At event 130, which may take place simultaneously or in conjunction with event 129, the invalidate vector 106 is updated to indicate that the TLB entry at index 1 does not have an invalidate operation pending.

At event 131, the cache line is retrieved from a backing storage location using the physical address corresponding to virtual address C. At event 132, the cache line is filled in the cache 108 (e.g., in set 1 in the example shown, as the cache line for set 0 includes the tag for virtual address B), and the cache line is tagged with the virtual address C, or a portion of the virtual address C (e.g., a subset of bits of the virtual address C). Additionally, the cache line is tagged with the TLB index 1 corresponding to the TLB entry which was allocated at event 129 with the translation of the virtual to physical address for the cache line. Furthermore, the TLB index valid bit for the cache line is set to 1, indicating that the virtual to physical address translation for the cache line stored in index 1 of the TLB 104 is valid.

Figure 1G:
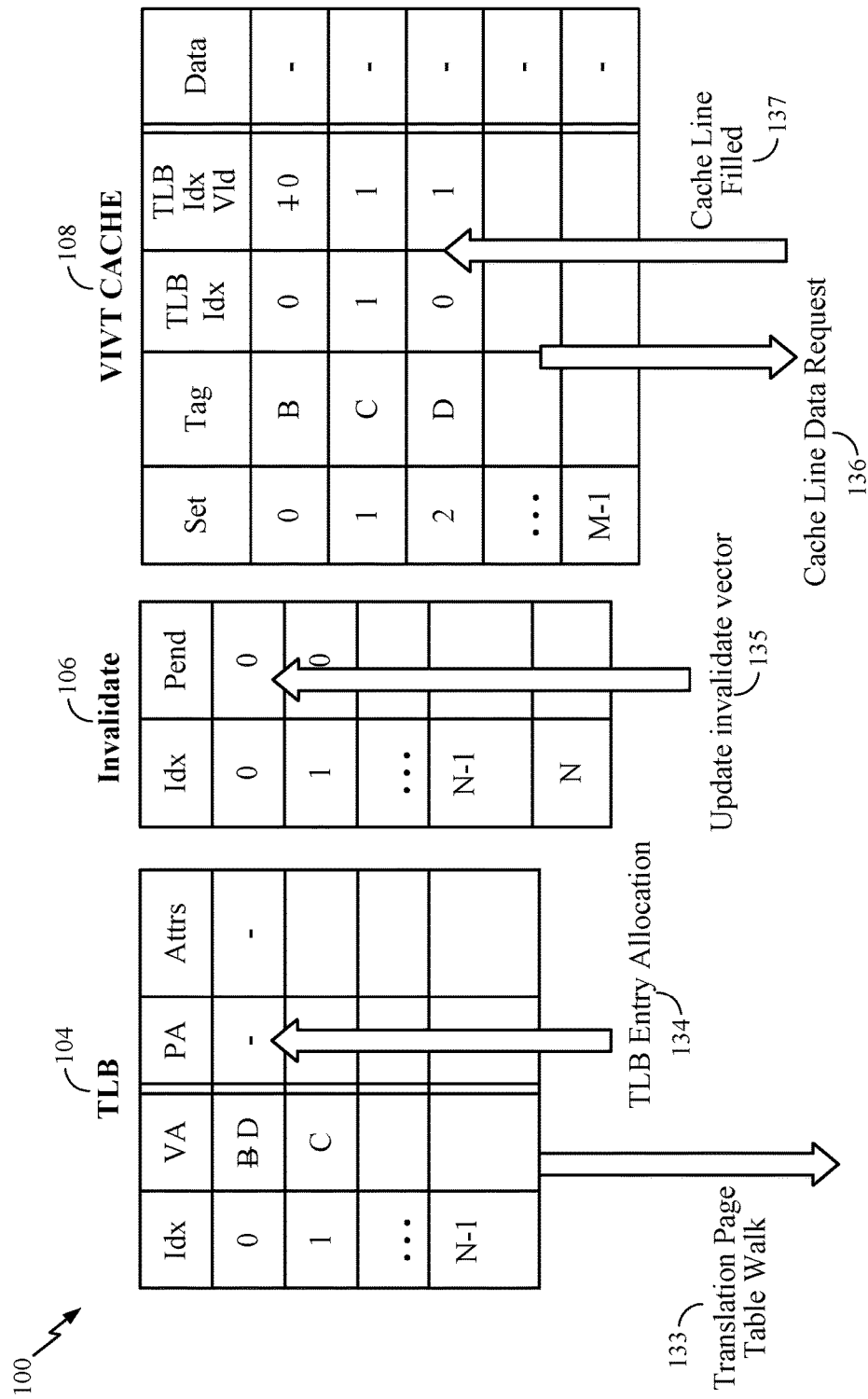

FIG. 1G depicts an example aspect where the entry for virtual address B is evicted and replaced from the TLB 104. Assuming the processor 102 requests to fetch a cache line from a virtual address denoted as "D" from the cache 108, there is a miss for the virtual address D in the cache 108, and there is a miss for a translation of the virtual address D in the TLB 104. As such, at event 133, a translation page table walk is performed to retrieve the translation for the virtual address D to a corresponding physical address. At event 134, the entry for virtual address B is evicted from index 0 of the TLB 104, and an entry for virtual address D is established. Again, establishing the entry for virtual address D includes storing the virtual address D and the retrieved physical address. At event 135, which may take place simultaneously or in conjunction with event 134, the invalidate vector 106 is updated to indicate that the TLB entry at index 0 does not have an invalidate operation pending.

At event 136, the cache line is retrieved from a backing storage location using the physical address corresponding to virtual address D. At event 137, the cache line is filled in the cache 108 (e.g., in set 2 in the example shown), and the cache line is tagged with the virtual address D, or a portion of the virtual address D (e.g., a subset of bits of the virtual address D). Additionally, the cache line tagged by virtual address D is tagged with the TLB index 0 corresponding to the TLB entry which was allocated at event 134 with the translation of the virtual to physical address for the cache line. Furthermore, the TLB index valid bit for the cache line tagged by virtual address D is set to 1, indicating that the virtual to physical address translation for the cache line stored in index 0 of the TLB 104 is valid. Further still, as shown, the TLB index valid bit for virtual address B is changed from 1 to 0, as the TLB index 0 no longer stores the virtual to physical translation for virtual address B.

Figure 1H:
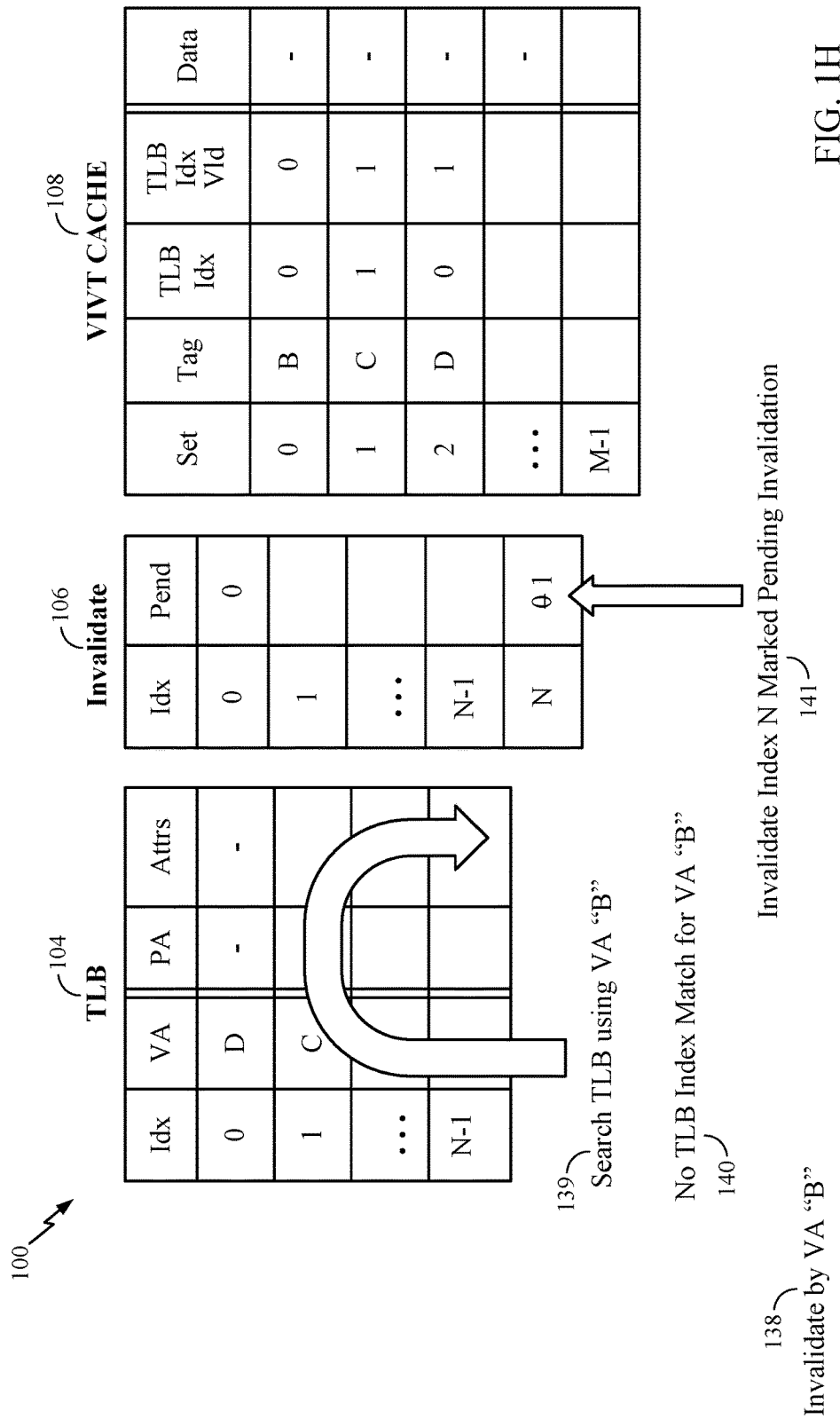

FIG. 1H depicts an aspect where a TLB invalidate instruction to invalidate by virtual address B is received at event 138. At event 139, the TLB 104 is searched using the virtual address B. However, because this entry was evicted in the example depicted in FIG. 1G, at event 140, no match is found in the TLB 104 for virtual address B. As such, the invalidate vector 106 at index N is marked pending invalidation at event 141. Doing so indicates that at least one invalidate operation targets at least one cache line in the cache 108, even though the corresponding translation is no longer resident in the TLB 104.

Figure 1I:
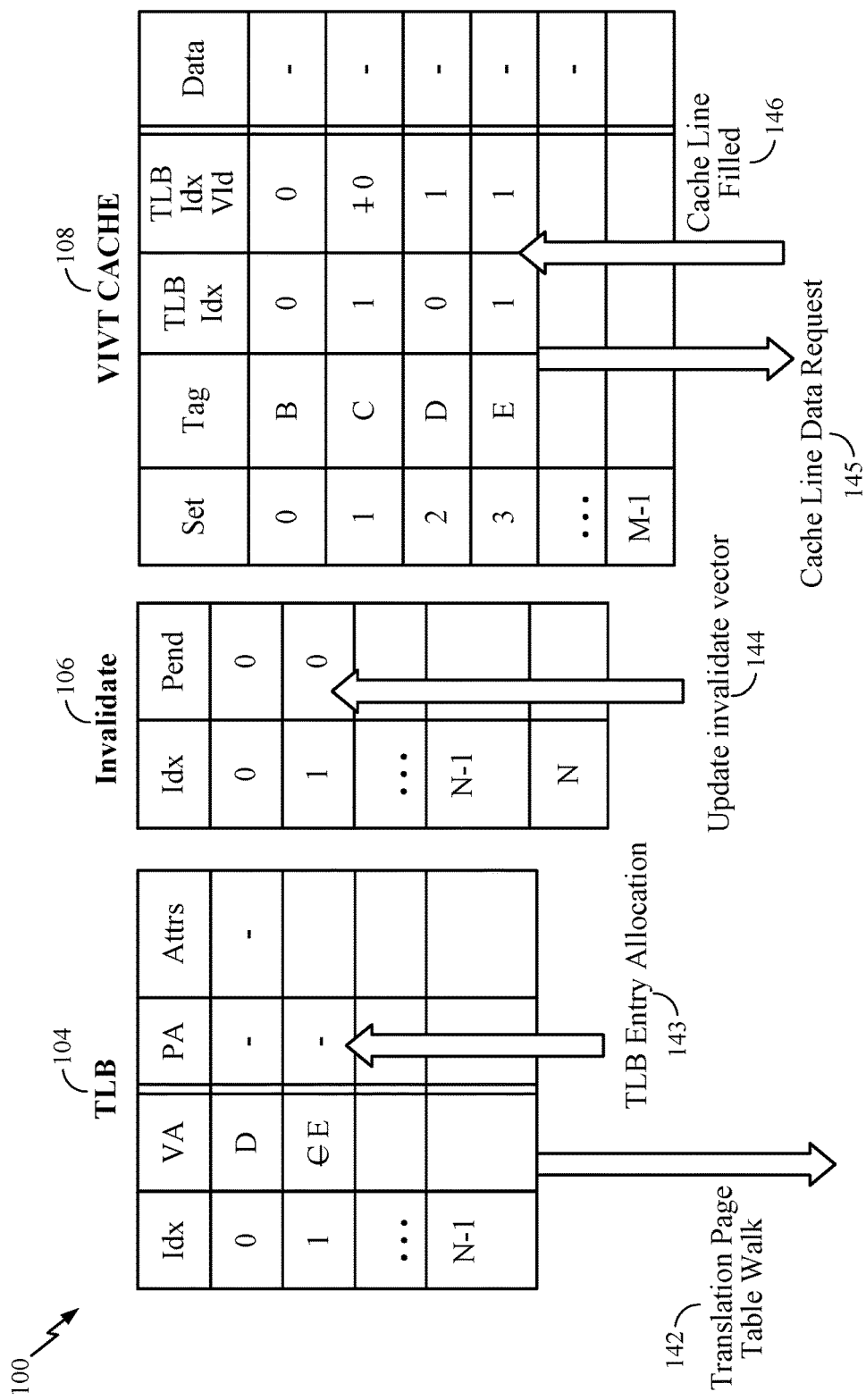

FIG. 1I depicts an example aspect where the entry for virtual address C is evicted and replaced from the TLB 104. Assuming the processor 102 requests to fetch a cache line from a virtual address denoted as "E" from the cache 108, there is a miss for the virtual address D in the cache 108, and there is a miss for a translation of the virtual address E in the TLB 104. As such, at event 142, a translation page table walk is performed to retrieve the translation for the virtual address E to a corresponding physical address. At event 143, the entry for virtual address C is evicted from index 1 of the TLB 104, and an entry for virtual address E is established. Again, establishing the entry for virtual address E includes storing the virtual address E and the retrieved physical address. At event 144, which may take place simultaneously or in conjunction with event 143, the invalidate vector 106 is updated to indicate that the TLB entry at index 1 does not have an invalidate operation pending.

At event 145, the cache line is retrieved from a backing storage location using the physical address corresponding to virtual address E. At event 146, the cache line is filled in the cache 108 (e.g., in set 3 in the example shown), and the cache line is tagged with the virtual address E, or a portion of the virtual address E (e.g., a subset of bits of the virtual address E). Additionally, the cache line tagged by virtual address E is tagged with the TLB index 1 corresponding to the TLB entry which was allocated at event 143 with the translation of the virtual to physical address for the cache line. Furthermore, the TLB index valid bit for the cache line tagged by virtual address E is set to 1, indicating that the virtual to physical address translation for the cache line stored in index 1 of the TLB 104 is valid. Further still, as shown, the TLB index valid bit for virtual address C is changed from 1 to 0, as the TLB index 0 no longer stores the virtual to physical translation for virtual address C.

Figure 1J:
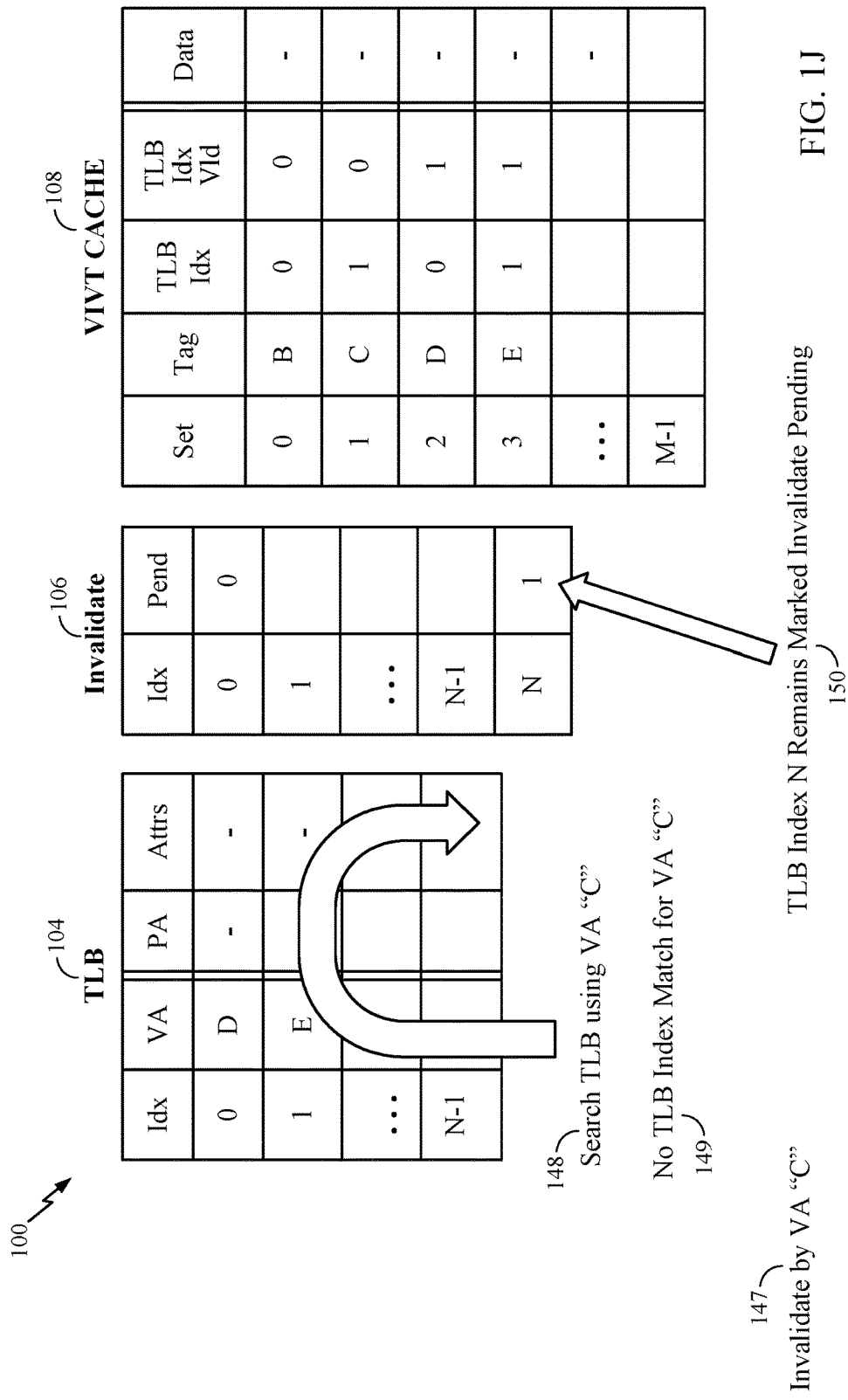

FIG. 1J depicts an aspect where a TLB invalidate instruction to invalidate by virtual address C is received at event 147. At event 148, the TLB 104 is searched using the virtual address C. However, because this entry was evicted in the example depicted in FIG. 1I, at event 149, no match is found in the TLB 104 for virtual address C. As such, the invalidate vector 106 at index N remains marked as pending invalidation at event 150. Doing so allows the index N of invalidate vector 106 to gather invalidates for multiple virtual addresses that do not have a translation in the TLB, without requiring extra storage for each such virtual address.

Figure 1K:
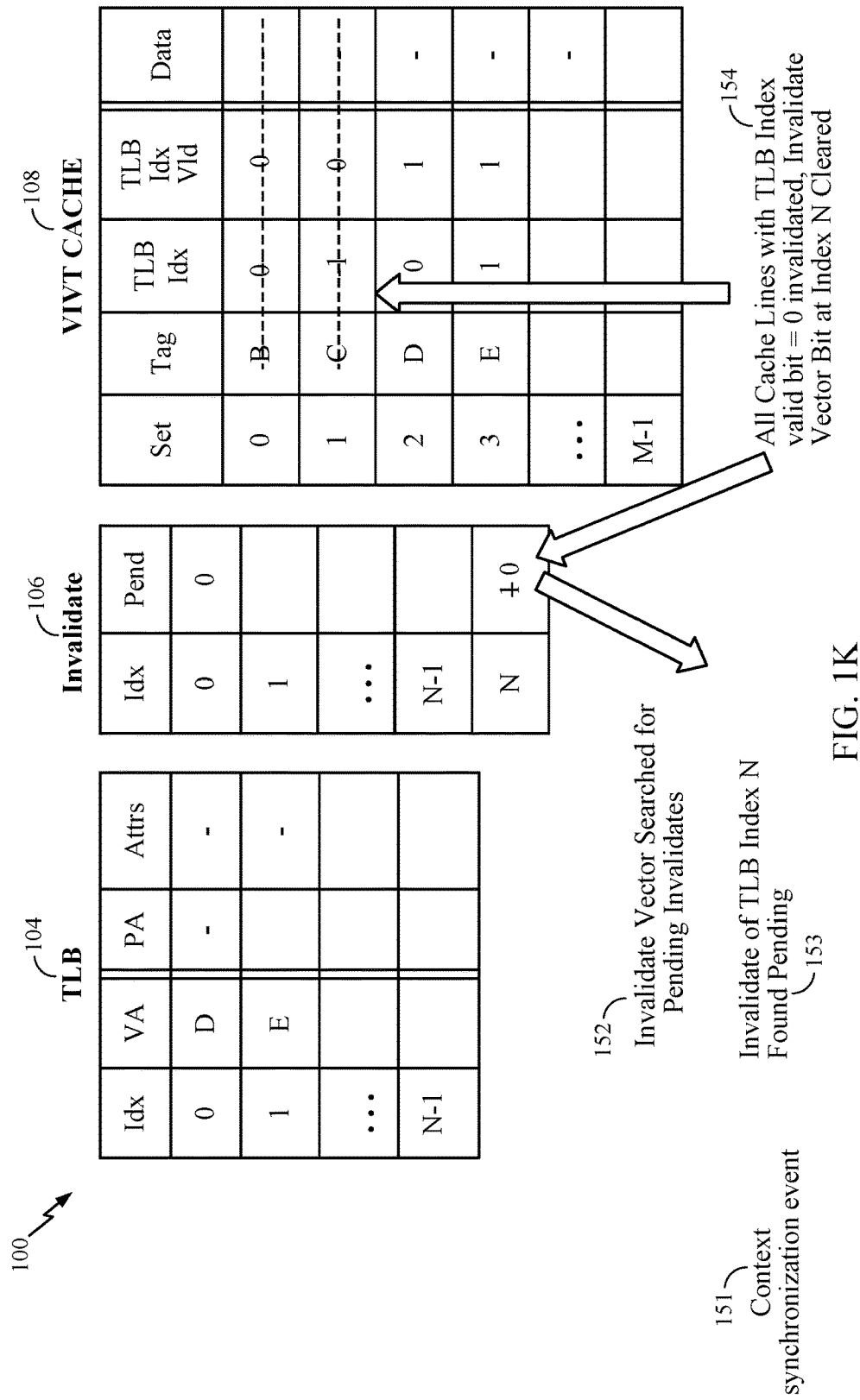

FIG. 1K depicts an aspect where a context synchronization event 151 is received by the processing system 100. At event 152, the invalidate vector 106 is searched for pending invalidates. Because the entry at index N of the invalidate vector 106 is set to 1, at least one invalidate of the cache 108 is determined to be pending at event 153. At event 154, all cache lines having a TLB index valid bit with a value of 0 are invalidated, and the bit at index N of the invalidate vector 106 is cleared (e.g., updated to 0). Specifically, as shown, in FIG. 1K, the cache lines for virtual addresses B and C are invalidated, while the cache lines for virtual addresses D and E are not invalidated. Doing so allows for selective invalidation of the cache 108, even if translations for the cache lines are not stored in the TLB 104.

Although the context synchronization event is one example described herein, the invalidate instructions reflected in invalidate vector 106 may also be applied based on events other than a context synchronization. For example, a software hint may be provided to apply the invalidate instructions. In another example, a miss in either TLB 104 or in cache 108 may be used as a trigger to apply the invalidate instructions.

In some aspects, a count may be maintained of the number of invalidates gathered in index N of invalidate vector 106. If this count exceeds a predefined threshold, then the invalidates may be applied when the count exceeds the threshold, rather than upon the occurrence of an event such as a context synchronization, a software hint, a miss in either TLB 104 or cache 108, etc.

Means for searching and modifying data stored in the TLB 104, invalidate vector 106, cache 108, and memory 110 include logic implemented as hardware and/or software. Similarly, the logic implemented as hardware and/or software may serve as means for reading and/or writing values, returning indications of hits and/or misses, evicting entries, and returning values from the TLB 104, invalidate vector 106, cache 108, and memory 110. Example of such means logic includes memory controllers, cache controllers, and data controllers.

Figure 2:
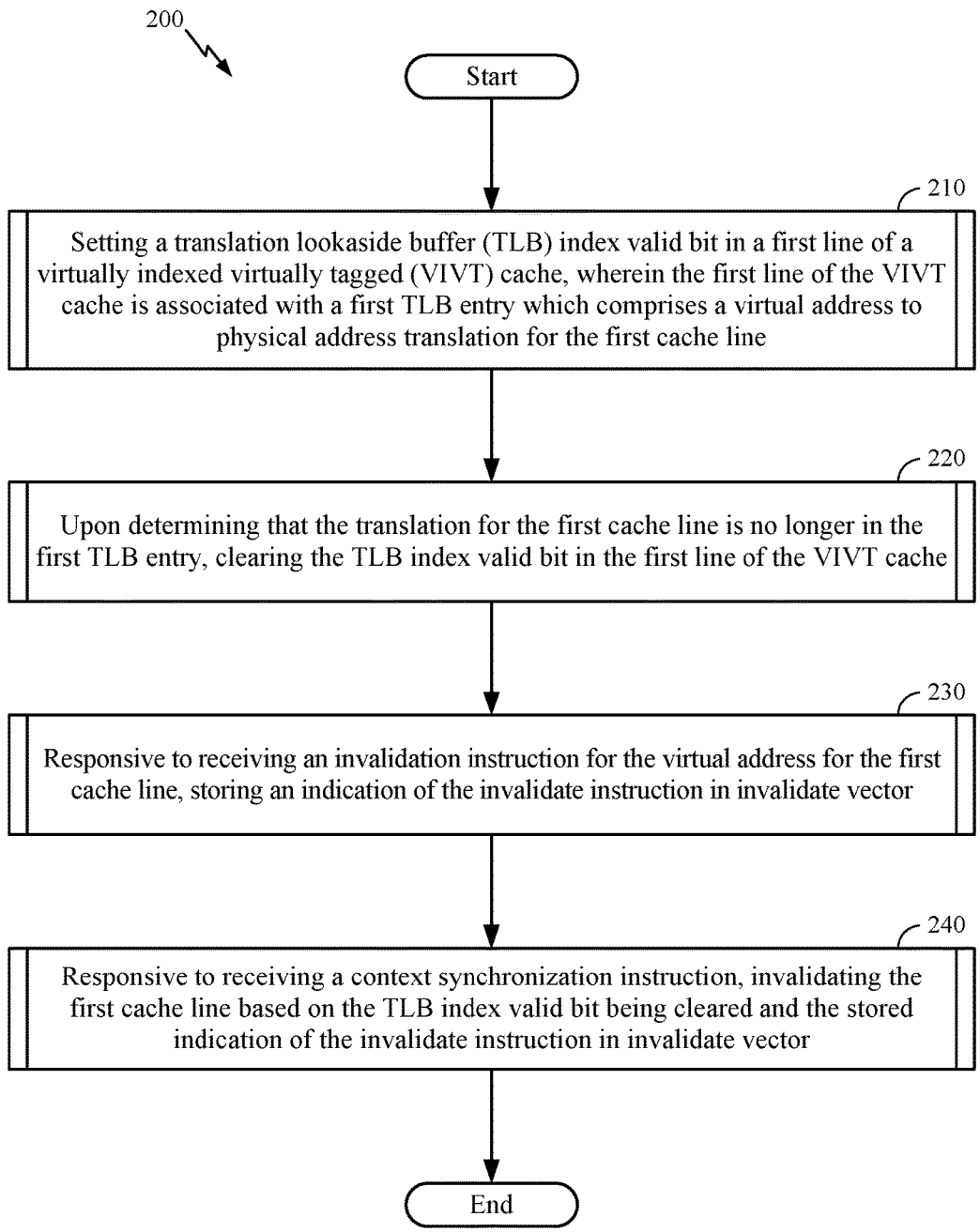
FIG. 2 is a flow chart illustrating a method to provide precise invalidation of virtually indexed virtually tagged caches, according to one aspect.

FIG. 2 is a flow chart illustrating a method 200 to provide precise invalidation of virtually indexed virtually tagged caches, according to one aspect. As shown, the method 200 includes block 210, which includes setting a TLB index valid bit (e.g., to "1") in a first line of the VIVT cache 108. The first line of the VIVT cache 108 is associated with a first TLB 104 entry which stores a virtual address to physical address translation for the first cache line. In one aspect, the TLB index valid bit is set when the first TLB 104 entry is established when the first cache line is filled. Block 210 is described in greater detail with reference to FIG. 3.

At block 220, the TLB index valid bit in the first line of the VIVT cache 108 is cleared (e.g., updated to "0") upon determining that the translation for the first cache line is no longer stored in the first TLB 104 entry. For example, the translation for the first cache line may be evicted and replaced with a different translation in the first entry of the TLB 104. Block 220 is described in greater detail with reference to FIG. 4. At block 230, an invalidation instruction is received for the virtual address of the first cache line, and an indication of the invalidate instruction is stored in the invalidate vector 106 (e.g., setting the corresponding bit to "1"). Block 230 is described in greater detail with reference to FIG. 5.

At block 240, a context synchronization instruction is received (e.g., from the processor 102), and the first cache line is invalidated in the cache 108 based on the TLB index valid bit for the first cache line being cleared and the stored indication of the invalidate instruction in the invalidate vector 240. Doing so allows the first cache line to be selectively invalidated, even though the translation for the first cache line is no longer resident in the TLB 104. Block 240 is described in greater detail with reference to FIG. 6.

Figure 3:
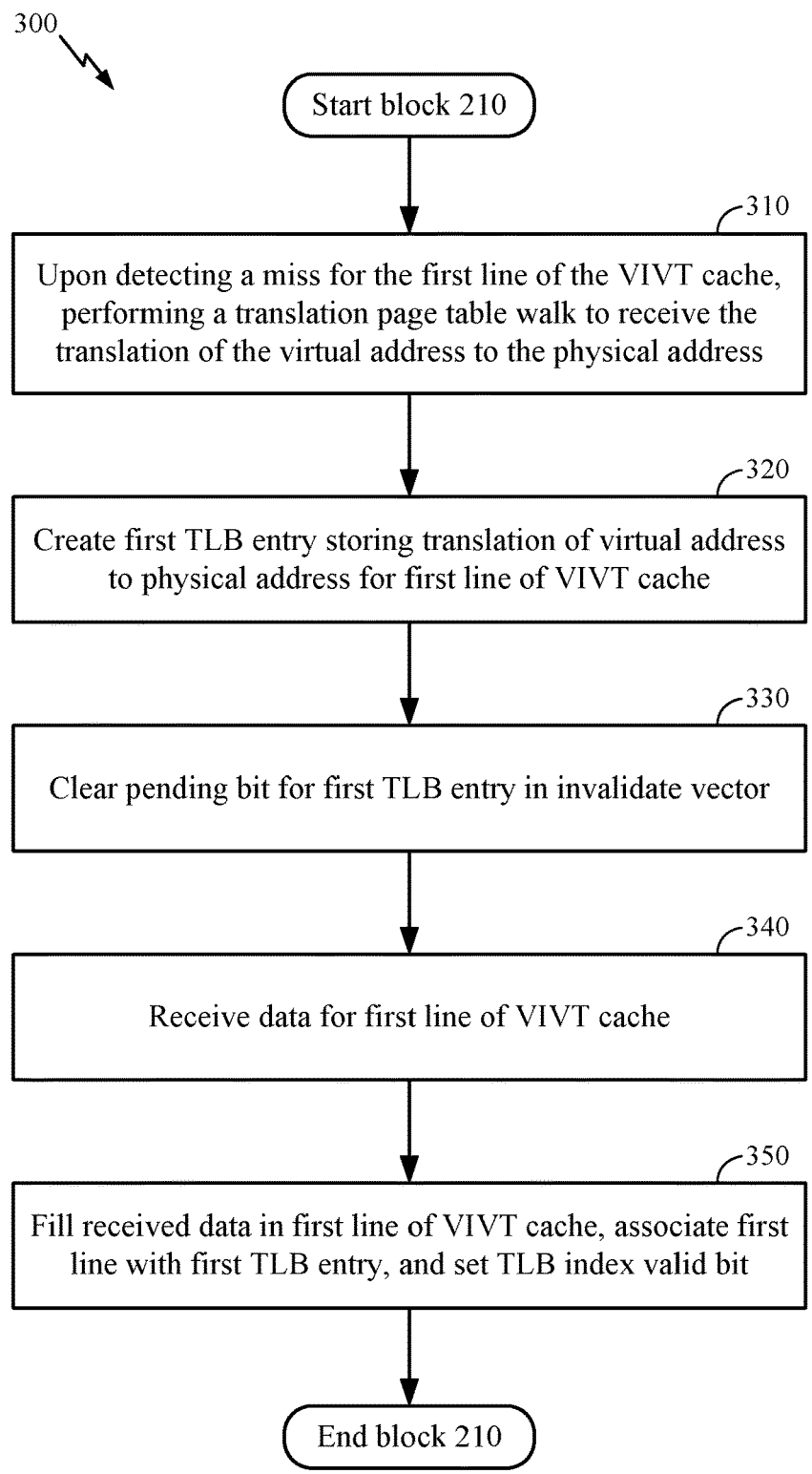
FIG. 3 is a flow chart illustrating a method to set a TLB index valid bit in a first line of a virtually indexed virtually tagged cache, according to one aspect.

FIG. 3 is a flow chart illustrating a method 300 corresponding to block 210 to set a TLB index valid bit in a first line of a virtually indexed virtually tagged cache, according to one aspect. As shown, the method 300 includes block 310, where upon detecting a miss for the first cache line of the VIVT cache 108, a translation page table walk is performed to receive a translation for of the virtual address to the physical address for the first cache line. At block 320, the first entry of the TLB 104 is created, which stores the virtual to physical translation received at block 310. At block 330, the pending bit for the first TLB entry in the invalidate vector 106 is cleared (e.g., updated to "0"). At block 340, the data for the first line of the VIVT cache 108 is received. At block 350, the data received at block 340 is filled in the first line of the VIVT cache 108, the first line of the VIVT cache 108 is associated with the first TLB entry created at block 320 (e.g., the index value of the first TLB entry is stored in the first cache line), and the TLB index valid bit is set (e.g., to "1") for the first cache line.

Figure 4:
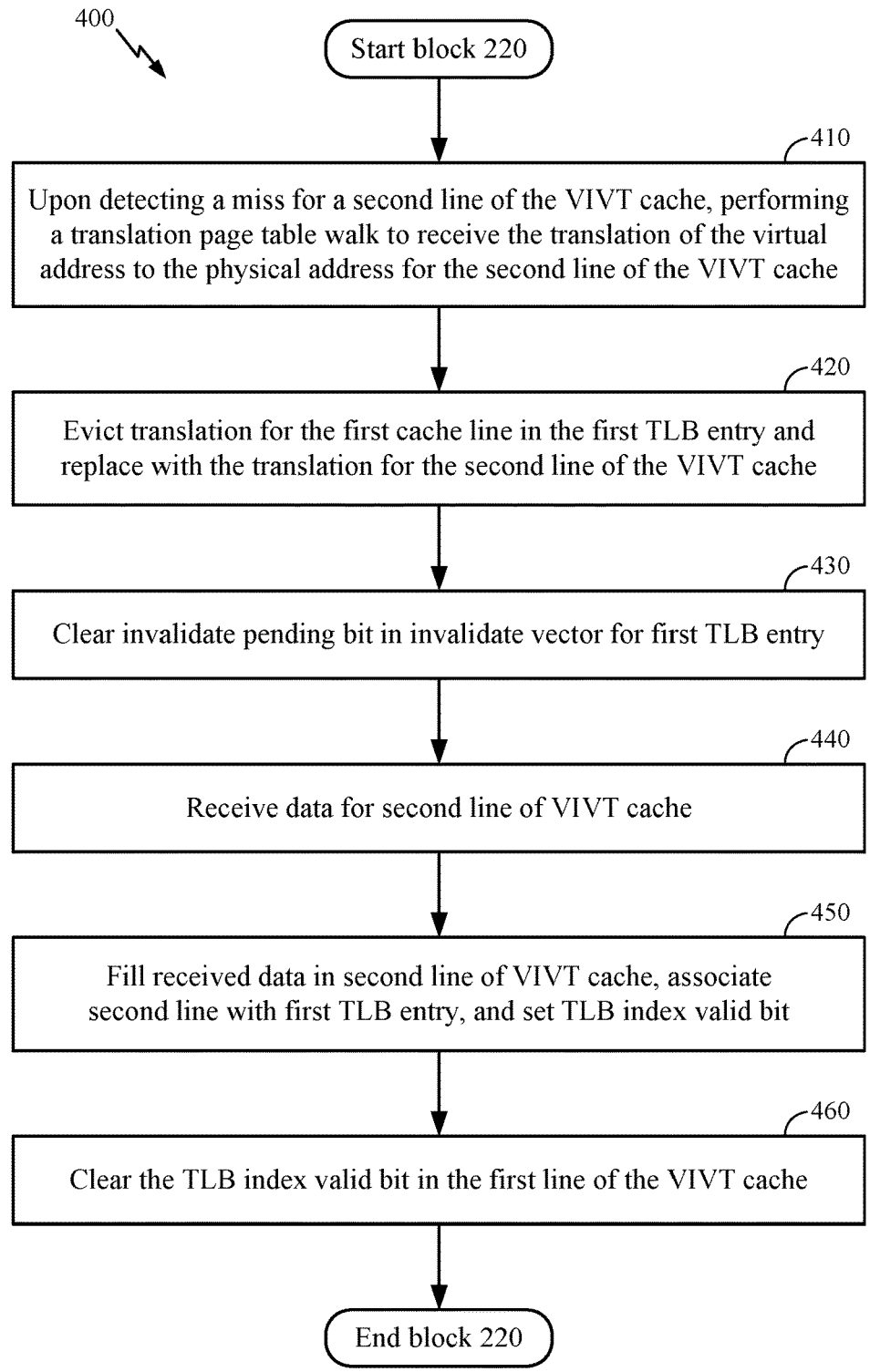
FIG. 4 is a flow chart illustrating a method to clear a TLB index valid bit in a first line of a virtually indexed virtually tagged cache, according to one aspect.

FIG. 4 is a flow chart illustrating a method 400 corresponding to block 220 to clear a TLB index valid bit in a first line of a virtually indexed virtually tagged cache, according to one aspect. As show, the method 400 includes block 410, where a miss for a second line of the VIVT cache 108 is detected, and a translation page table walk is performed to receive the translation of the virtual address to the physical address for the second line of the VIVT cache 108. At block 420, the translation for the first cache line in the first entry of the TLB 104 is evicted and replaced with the translation for the second cache line received at block 410. At block 430, the invalidate pending bit in the invalidate vector 106 is cleared for the first TLB entry. At block 440, the data for the second line of the VIVT cache 108 is received. At block 450, the data received at block 440 is filled in the second line of the VIVT cache 108, the second line of the VIVT cache is associated with the first TLB entry (e.g., the index value of the first TLB entry is stored in the second cache line), and the TLB index valid bit for the second cache line is set. At block 460, the TLB index valid bit in the first line of the VIVT cache 108 is cleared, as the translation for the first line of the VIVT cache 108 is no longer stored in the corresponding index of the TLB 104.

Figure 5:
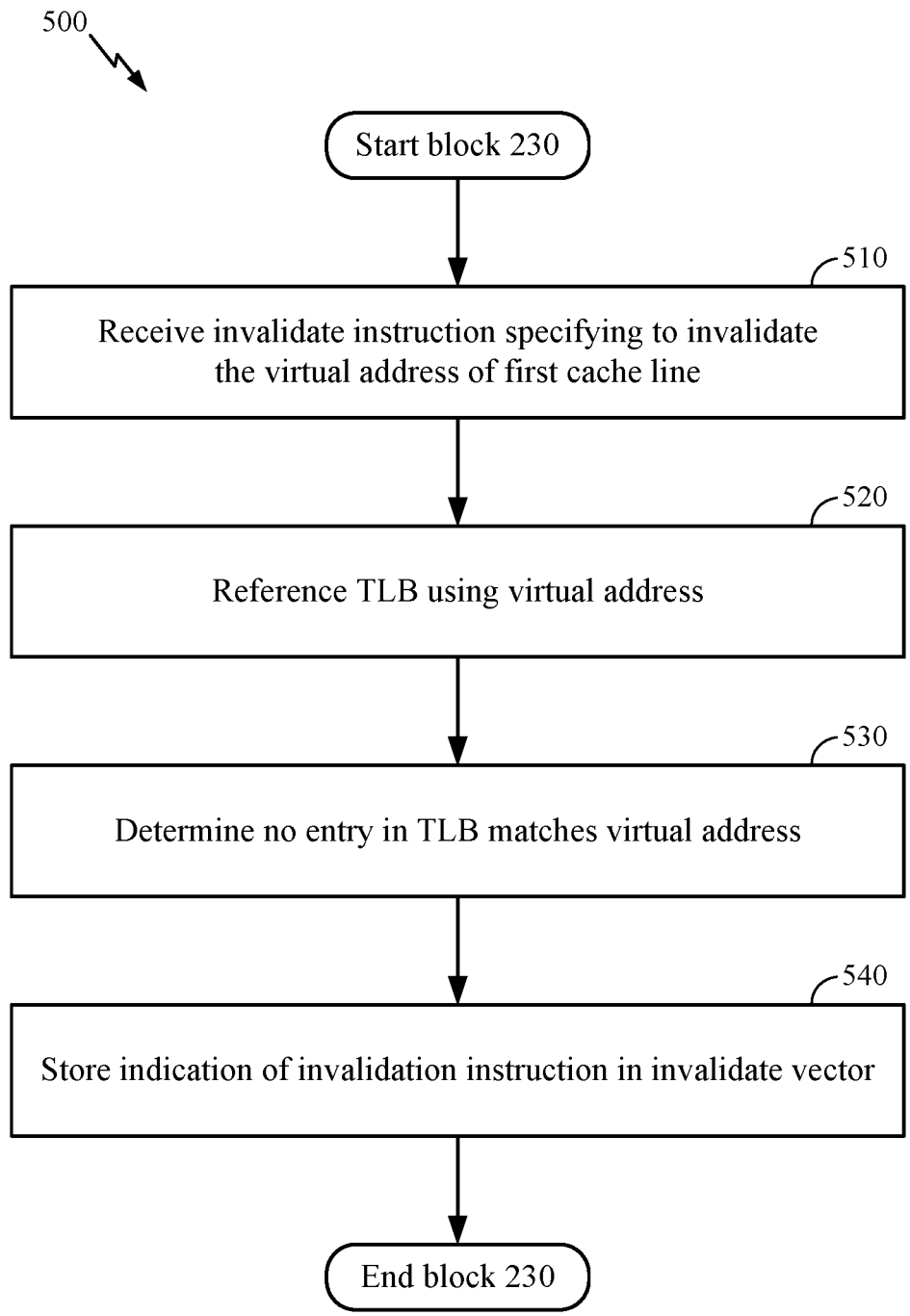
FIG. 5 is a flow chart illustrating a method to store an indication of an invalidate instruction, according to one aspect.

FIG. 5 is a flow chart illustrating a method 500 corresponding to block 230 to store an indication of an invalidate instruction, according to one aspect. As shown, the method 500 includes block 510, where an invalidate instruction specifying to invalidate the virtual address of the first line of the VIVT cache 108 is received. In at least one aspect, the processor 102 and/or an operating system generates the invalidate instruction. At block 520, the TLB 104 is referenced using the virtual address specified in the invalidate instruction. At block 530, it is determined that no entry in the TLB 104 matches the virtual address, as the translation for the virtual address was evicted and replaced. At block 540, an indication of a received invalidate instruction is stored in the invalidate vector 106, e.g., in the entry of the invalidate vector 106 that is associated with translations that are no longer resident in the TLB 104 after being evicted. Doing so allows the first cache line to remain resident in the VIVT cache 108 until a context synchronization instruction is received, and the VIVT cache 108 to be selectively invalidated.

Figure 6:
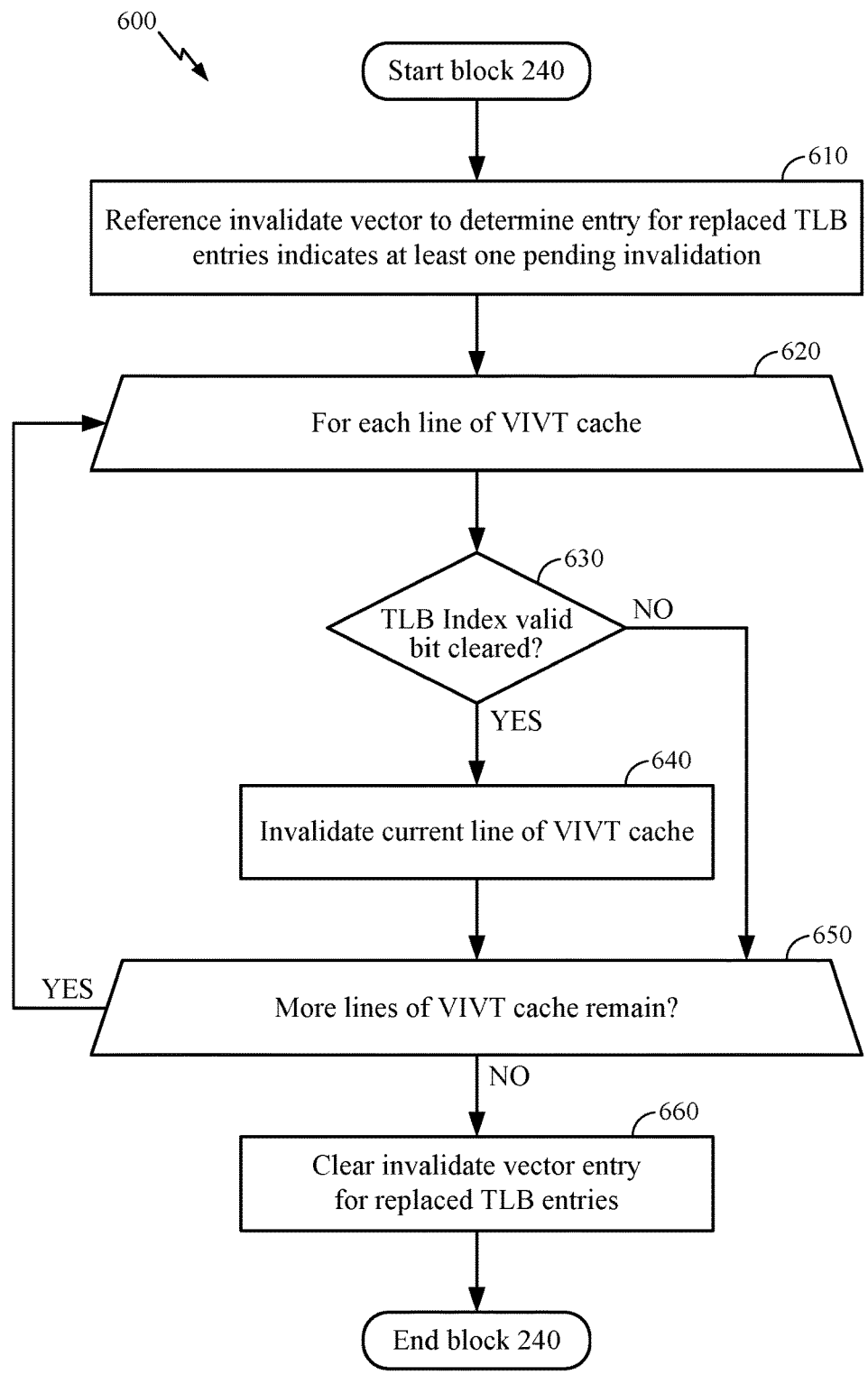
FIG. 6 is a flow chart illustrating a method to invalidate a first cache line, according to one aspect.

FIG. 6 is a flow chart illustrating a method 600 corresponding to block 240 to selectively invalidate a first cache line, according to one aspect. As shown, the method 600 includes block 610, where the invalidate vector 106 is referenced to determine if the entry for evicted TLB entries indicates at least one pending invalidation for evicted TLB entries (e.g., the corresponding bit has a value of "1"). At block 620, a loop including blocks 630-650 is executed for each line of the VIVT cache 108. At block 630, a determination is made as to whether the TLB index valid bit for the current cache line has been cleared. If the TLB index valid bit has not been cleared (e.g., has a value of "1"), the current cache line is not invalidated and the method proceeds to block 650. However, if the TLB index valid bit has been cleared (e.g., has a value of "0"), the TLB 104 no longer includes a translation for the current cache line, and the method proceeds to block 640, where the current cache line is invalidated. In one aspect, doing so includes clearing a valid bit for the current cache line. At block 650, a determination is made as to whether more lines of the VIVT cache 108 remain. If more lines remain, the method returns to block 620, otherwise, the method proceeds to block 660. At block 660, the entry for replaced TLB entries in the invalidate vector 106 is cleared (e.g., set to "0").

Figure 7:
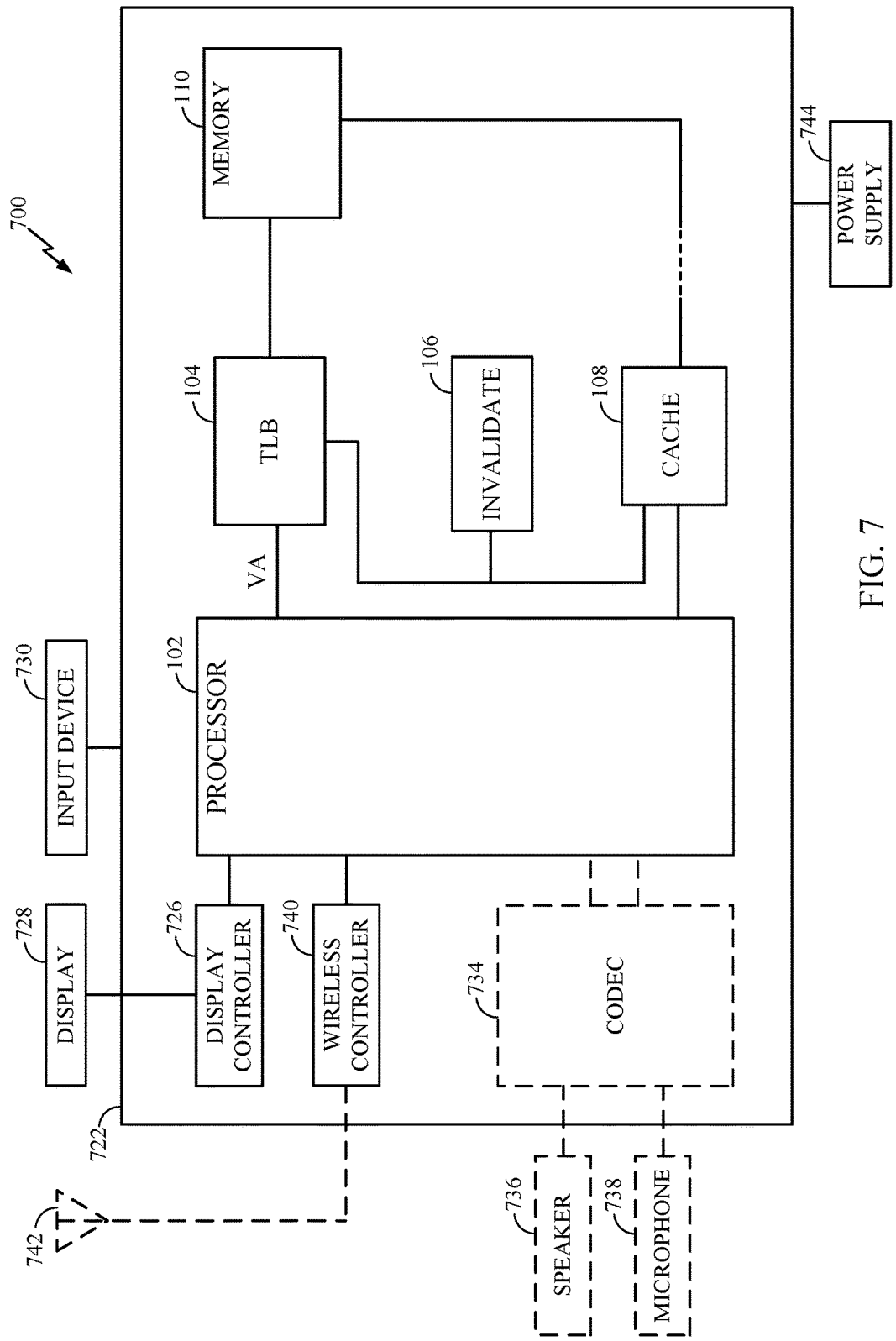
FIG. 7 is a block diagram illustrating a computing device integrating a virtually indexed virtually tagged cache, according to one aspect.

An example apparatus in which exemplary aspects of this disclosure may be utilized is discussed in relation to FIG. 7. FIG. 7 shows a block diagram of computing device 700. Computing device 700 may correspond to an exemplary implementation of a processing system configured to perform the methods depicted in FIGS. 2-6. In the depiction of FIG. 7, computing device 700 includes processor 102, TLB 104, invalidate vector 106, cache 108, and memory 110. More generally as discussed with reference to FIGS. 1A-1K, but other memory configurations may also be supported by computing device 700.

FIG. 7 also shows display controller 726 that is coupled to processor 102 and to display 728. In some cases, computing device 700 may be used for wireless communication and FIG. 7 also shows optional blocks in dashed lines, such as coder/decoder (CODEC) 734 (e.g., an audio and/or voice CODEC) coupled to processor 102 and speaker 736 and microphone 738 can be coupled to CODEC 734; and wireless antenna 742 coupled to wireless controller 740 which is coupled to processor 102. Where one or more of these optional blocks are present, in a particular aspect, processor 102, display controller 726, memory 110, and wireless controller 740 are included in a system-in-package or system-on-chip device 722.

Accordingly, in a particular aspect, input device 730 and power supply 744 are coupled to the system-on-chip device 722. Moreover, in a particular aspect, as illustrated in FIG. 7, where one or more optional blocks are present, display 728, input device 730, speaker 736, microphone 738, wireless antenna 742, and power supply 744 are external to the system-on-chip device 722. However, each of display 728, input device 730, speaker 736, microphone 738, wireless antenna 742, and power supply 744 can be coupled to a component of the system-on-chip device 722, such as an interface or a controller.

Although FIG. 7 generally depicts a computing device, processor 102 and memory 110, may also be integrated into a set top box, a music player, a video player, an entertainment unit, a navigation device, a personal digital assistant (PDA), a fixed location data unit, a server, a computer, a laptop, a tablet, a communications device, a mobile phone, or other similar devices.

A number of aspects have been described. However, various modifications to these aspects are possible, and the principles presented herein may be applied to other aspects as well. The various tasks of such methods may be implemented as sets of instructions executable by one or more arrays of logic elements, such as microprocessors, embedded controllers, or IP cores.

The various operations of methods described above may be performed by any suitable means capable of performing the operations, such as a processor, firmware, application specific integrated circuit (ASIC), gate logic/registers, memory controller, or a cache controller. Generally, any operations illustrated in the Figures may be performed by corresponding functional means capable of performing the operations.

The foregoing disclosed devices and functionalities may be designed and configured into computer files (e.g. RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. Some or all such files may be provided to fabrication handlers who configure fabrication equipment using the design data to fabricate the devices described herein. Resulting products formed from the computer files include semiconductor wafers that are then cut into semiconductor die (e.g., the processor 102) and packaged, and may be further integrated into products including, but not limited to, mobile phones, smart phones, laptops, netbooks, tablets, ultrabooks, desktop computers, digital video recorders, set-top boxes and any other devices where integrated circuits are used.

In one aspect, the computer files form a design structure including the circuits described above and shown in the Figures in the form of physical design layouts, schematics, a hardware-description language (e.g., Verilog, VHDL, etc.). For example, design structure may be a text file or a graphical representation of a circuit as described above and shown in the Figures. Design process preferably synthesizes (or translates) the circuits described below into a netlist, where the netlist is, for example, a list of wires, transistors, logic gates, control circuits, I/O, models, etc. that describes the connections to other elements and circuits in an integrated circuit design and recorded on at least one of machine readable medium. For example, the medium may be a storage medium such as a CD, a compact flash, other flash memory, or a hard-disk drive. In another aspect, the hardware, circuitry, and method described herein may be configured into computer files that simulate the function of the circuits described above and shown in the Figures when executed by a processor. These computer files may be used in circuitry simulation tools, schematic editors, or other software applications.

The implementations of aspects disclosed herein may also be tangibly embodied (for example, in tangible, computer-readable features of one or more computer-readable storage media as listed herein) as one or more sets of instructions executable by a machine including an array of logic elements (e.g., a processor, microprocessor, microcontroller, or other finite state machine). The term "computer-readable medium" may include any medium that can store or transfer information, including volatile, nonvolatile, removable, and non-removable storage media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk or any other medium which can be used to store the desired information, a fiber optic medium, a radio frequency (RF) link, or any other medium which can be used to carry the desired information and can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such aspects.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A method, comprising:
    setting a translation lookaside buffer (TLB) index valid bit in a first line of a virtually indexed virtually tagged (VIVT) cache, wherein the first line of the VIVT cache is associated with a first TLB entry which comprises a virtual address to physical address translation for the first cache line;
    upon determining that the translation for the first cache line is no longer in the first TLB entry, clearing the TLB index valid bit in the first line of the VIVT cache;
    responsive to receiving a translation invalidate instruction for the virtual address, storing an indication of the invalidate instruction; and
    responsive to receiving a context synchronization instruction, invalidating the first line of the VIVT cache based on the TLB index valid bit being cleared and the stored indication of the invalidate instruction.

2. The method of claim 1, wherein the indication is stored in a first entry of an invalidate vector, wherein the first entry is of a plurality of entries in the invalidate vector and corresponds to TLB entries that have been evicted and replaced, wherein the indication stored in the first entry specifies that an invalidate instruction is pending.

3. The method of claim 2, further comprising:
    responsive to receiving the context synchronization instruction, determining that the first entry of the invalidate vector indicates that an invalidate instruction is pending.

4. The method of claim 3, further comprising:
    invalidating each line of the VIVT cache having a TLB index valid bit that has been cleared.

5. The method of claim 4, further comprising:
    responsive to receiving the invalidate instruction for the virtual address, translating the virtual address to the physical address;
    referencing the TLB with the translated physical address;
    determining that the TLB does not include an entry matching the translated physical address; and
    storing the indication in the first entry of the invalidate vector.

6. The method of claim 1, further comprising prior to setting the TLB index valid bit of the first line of the VIVT cache:
    detecting a miss for the first line of VIVT cache in the VIVT cache;
    performing a translation page table walk to receive the translation for the first cache line;
    storing, in the first TLB entry, the translation for the first cache line;
    receiving the data for the first line of the VIVT cache; and
    filling the first line of the VIVT cache with the received data, wherein the TLB index valid bit of the first line of the VIVT cache is set while filling the first line of the VIVT cache with the received data, and wherein the first line of the VIVT cache is associated with the first TLB entry while filling the first line of the VIVT cache with the received data.

7. The method of claim 1, wherein the determining that the translation for the first cache line is no longer in the first TLB entry is based on determining that the translation for the first cache line in the first TLB entry was evicted and replaced with a different translation.

8. The method of claim 1, wherein the VIVT cache is an instruction cache that is visible to software as a physically indexed physically tagged (PIPT) cache.

9. A non-transitory computer-readable medium storing instructions that, when executed by a processor, cause the processor to perform an operation comprising:
   setting a translation lookaside buffer (TLB) index valid bit in a first line of a virtually indexed virtually tagged (VIVT) cache, wherein the first line of the VIVT cache is associated with a first TLB entry which comprises a virtual address to physical address translation for the first cache line;
   upon determining that the translation for the first cache line is no longer in the first TLB entry, clearing the TLB index valid bit in the first line of the VIVT cache;
   responsive to receiving a translation invalidate instruction for the virtual address, storing an indication of the invalidate instruction; and
   responsive to receiving a context synchronization instruction, invalidating the first line of the VIVT cache based on the TLB index valid bit being cleared and the stored indication of the invalidate instruction.

10. The non-transitory computer-readable medium of claim 9, wherein the indication is stored in a first entry of an invalidate vector, wherein the first entry is of a plurality of entries in the invalidate vector and corresponds to TLB entries that have been evicted and replaced, wherein the indication stored in the first entry specifies that an invalidate instruction is pending.

11. The non-transitory computer-readable medium of claim 10, the operation further comprising:
   responsive to receiving the context synchronization instruction, determining that the first entry of the invalidate vector indicates that an invalidate instruction is pending.

12. The non-transitory computer-readable medium of claim 11, the operation further comprising:
   invalidating each line of the VIVT cache having a TLB index valid bit that has been cleared.

13. The non-transitory computer-readable medium of claim 12, the operation further comprising:
   responsive to receiving the invalidate instruction for the virtual address, translating the virtual address to the physical address;
   referencing the TLB with the translated physical address;
   determining that the TLB does not include an entry matching the translated physical address; and
   storing the indication in the first entry of the invalidate vector.

14. The non-transitory computer-readable medium of claim 9, the operation further comprising prior to setting the TLB index valid bit of the first line of the VIVT cache:
   detecting a miss for the first line of VIVT cache in the VIVT cache;
   performing a translation page table walk to receive the translation for the first cache line;
   storing, in the first TLB entry, the translation for the first cache line;
   receiving the data for the first line of the VIVT cache; and
   filling the first line of the VIVT cache with the received data, wherein the TLB index valid bit of the first line of the VIVT cache is set while filling the first line of the VIVT cache with the received data, and wherein the first line of the VIVT cache is associated with the first TLB entry while filling the first line of the VIVT cache with the received data.

15. The non-transitory computer-readable medium of claim 9, wherein the determining that the translation for the first cache line is no longer in the first TLB entry is based on determining that the translation for the first cache line in the first TLB entry was evicted and replaced with a different translation.

16. The non-transitory computer-readable medium of claim 9, wherein the VIVT cache is an instruction cache that is visible to software as a physically indexed physically tagged (PIPT) cache.

17. An apparatus, comprising:
   a translation lookaside buffer (TLB);
   a virtually indexed virtually tagged (VIVT) cache; and
   logic configured to perform an operation comprising:
      setting an index valid bit in a first line of the VIVT cache, wherein the first line of the VIVT cache is associated with a first TLB entry which comprises a virtual address to physical address translation for the first cache line;
      upon determining that the translation for the first cache line is no longer in the first TLB entry, clearing the TLB index valid bit in the first line of the VIVT cache;
      responsive to receiving a translation invalidate instruction for the virtual address, storing an indication of the invalidate instruction; and
      responsive to receiving a context synchronization instruction, invalidating the first line of the VIVT cache based on the TLB index valid bit being cleared and the stored indication of the invalidate instruction.

18. The apparatus of claim 17, further comprising an invalidate vector, wherein the indication is stored in a first entry of the invalidate vector, wherein the first entry is of a plurality of entries in the invalidate vector and corresponds to TLB entries that have been evicted and replaced, wherein the indication stored in the first entry specifies that an invalidate instruction is pending.

19. The apparatus of claim 18, the operation further comprising:
   responsive to receiving the context synchronization instruction, determining that the first entry of the invalidate vector indicates that an invalidate instruction is pending.

20. The apparatus of claim 19, the operation further comprising:
   invalidating each line of the VIVT cache having a TLB index valid bit that has been cleared.

21. The apparatus of claim 20, the operation further comprising:
   responsive to receiving the invalidate instruction for the virtual address, translating the virtual address to the physical address;
   referencing the TLB with the translated physical address;
   determining that the TLB does not include an entry matching the translated physical address; and
   storing the indication in the first entry of the invalidate vector.

22. The apparatus of claim 17, the operation further comprising prior to setting the TLB index valid bit of the first line of the VIVT cache:
   detecting a miss for the first line of VIVT cache in the VIVT cache;
   performing a translation page table walk to receive the translation for the first cache line;
   storing, in the first TLB entry, the translation for the first cache line;

receiving the data for the first line of the VIVT cache; and filling the first line of the VIVT cache with the received data, wherein the TLB index valid bit of the first line of the VIVT cache is set while filling the first line of the VIVT cache with the received data, and wherein the first line of the VIVT cache is associated with the first TLB entry while filling the first line of the VIVT cache with the received data.

23. The apparatus of claim 17, wherein the determining that the translation for the first cache line is no longer in the first TLB entry is based on determining that the translation for the first cache line in the first TLB entry was evicted and replaced with a different translation.

24. The apparatus of claim 17, wherein the VIVT cache is an instruction cache that is visible to software as a physically indexed physically tagged (PIPT) cache.

25. An apparatus, comprising:
a translation lookaside buffer (TLB);
a virtually indexed virtually tagged (VIVT) cache;
means for setting an index valid bit in a first line of the VIVT cache, wherein the first line of the VIVT cache is associated with a first TLB entry which comprises a virtual address to physical address translation for the first cache line;
upon determining that the translation for the first cache line is no longer in the first TLB entry, means for clearing the TLB index valid bit in the first line of the VIVT cache;
responsive to receiving a translation invalidate instruction for the virtual address, means for storing an indication of the invalidate instruction; and
responsive to receiving a context synchronization instruction, means for invalidating the first line of the VIVT cache based on the TLB index valid bit being cleared and the stored indication of the invalidate instruction.

26. The apparatus of claim 25, further comprising an invalidate vector, wherein the indication is stored in a first entry of the invalidate vector, wherein the first entry is of a plurality of entries in the invalidate vector and corresponds to TLB entries that have been evicted and replaced, wherein the indication stored in the first entry specifies that an invalidate instruction is pending.

27. The apparatus of claim 26, wherein the VIVT cache is an instruction cache that is visible to software as a physically indexed physically tagged (PIPT) cache, the apparatus further comprising:
responsive to receiving the context synchronization instruction, means for determining that the first entry of the invalidate vector indicates that an invalidate instruction is pending.

28. The apparatus of claim 27, further comprising:
means for invalidating each line of the VIVT cache having a TLB index valid bit that has been cleared.

29. The apparatus of claim 28, further comprising:
responsive to receiving the invalidate instruction for the virtual address, means for translating the virtual address to the physical address;
means for referencing the TLB with the translated physical address;
means for determining that the TLB does not include an entry matching the translated physical address; and
means for storing the indication in the first entry of the invalidate vector.

30. The apparatus of claim 25, further comprising prior to setting the TLB index valid bit of the first line of the VIVT cache:
means for detecting a miss for the first line of VIVT cache in the VIVT cache;
means for performing a translation page table walk to receive the translation for the first cache line;
means for storing, in the first TLB entry, the translation for the first cache line;
means for receiving the data for the first line of the VIVT cache; and
means for filling the first line of the VIVT cache with the received data, wherein the TLB index valid bit of the first line of the VIVT cache is set while filling the first line of the VIVT cache with the received data, and wherein the first line of the VIVT cache is associated with the first TLB entry while filling the first line of the VIVT cache with the received data.

* * * * *